(12) United States Patent
Noda et al.

(10) Patent No.: US 9,097,879 B2
(45) Date of Patent: Aug. 4, 2015

(54) ZOOM LENS AND IMAGING APPARATUS

(71) Applicant: FUJIFILM Corporation, Tokyo (JP)

(72) Inventors: Taiga Noda, Saitama-ken (JP); Michio Cho, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/299,165

(22) Filed: Jun. 9, 2014

(65) Prior Publication Data

US 2014/0293437 A1    Oct. 2, 2014

Related U.S. Application Data

(63) Continuation of application No. PCT/JP2012/007823, filed on Dec. 6, 2012.

(30) Foreign Application Priority Data

Dec. 9, 2011 (JP) ................................ 2011-269674

(51) Int. Cl.
G02B 13/04    (2006.01)
G02B 15/177    (2006.01)

(52) U.S. Cl.
CPC .............. *G02B 13/04* (2013.01); *G02B 15/177* (2013.01)

(58) Field of Classification Search
CPC ............................. G02B 13/009; G02B 13/04
USPC .......................... 359/676, 680, 681, 686, 689
See application file for complete search history.

(56) References Cited

U.S. PATENT DOCUMENTS

| 2003/0072088 | A1 | 4/2003 | Obama |
| 2009/0161229 | A1 | 6/2009 | Shimada |
| 2011/0080649 | A1 | 4/2011 | Kanbayashi et al. |
| 2012/0243107 | A1* | 9/2012 | Abe et al. ................ 359/680 |

FOREIGN PATENT DOCUMENTS

| JP | 2003-107348 | | 4/2003 |
| JP | 2004-094283 | | 3/2004 |
| JP | 2004-117828 | | 4/2004 |
| JP | 2009-156905 | | 7/2009 |
| JP | 2011065224 | A1 * | 3/2011 |
| JP | 2011-081185 | | 4/2011 |

OTHER PUBLICATIONS

International Search Report PCT/JP2012/007823 dated Mar. 19, 2013.

* cited by examiner

*Primary Examiner* — Darryl J Collins
*Assistant Examiner* — Journey Sumlar
(74) *Attorney, Agent, or Firm* — Young & Thompson

(57) ABSTRACT

A zoom lens includes, in order from the object side, a first lens group having a negative refractive power, a second lens group having a positive refractive power and a third lens group having a positive refractive power, wherein, during magnification change from the wide-angle end to the telephoto end, at least the first lens group and the second lens group are moved along the optical axis such that the interval between the first lens group and the second lens group is decreased and the interval between the second lens group and the third lens group is increased. The second lens group includes, in order from the object side, a positive lens, a cemented lens formed by a positive lens and a negative lens, a positive lens and a negative lens. The zoom lens satisfies given conditional expressions.

8 Claims, 21 Drawing Sheets

FIG.12
EXAMPLE 2
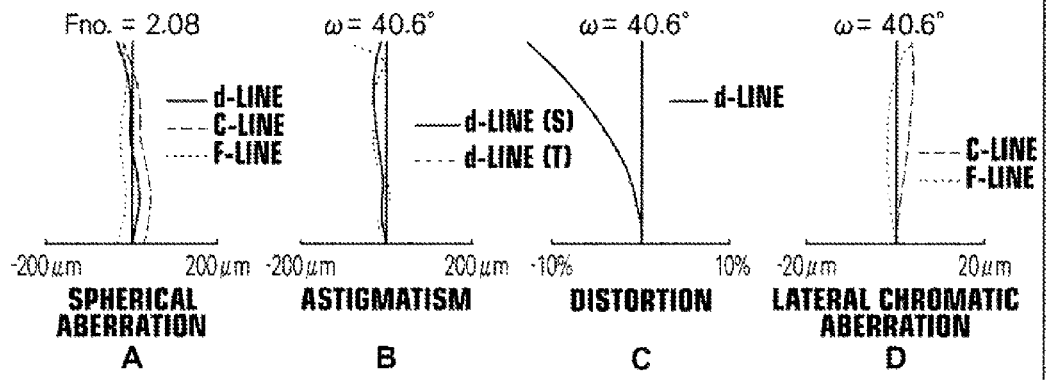
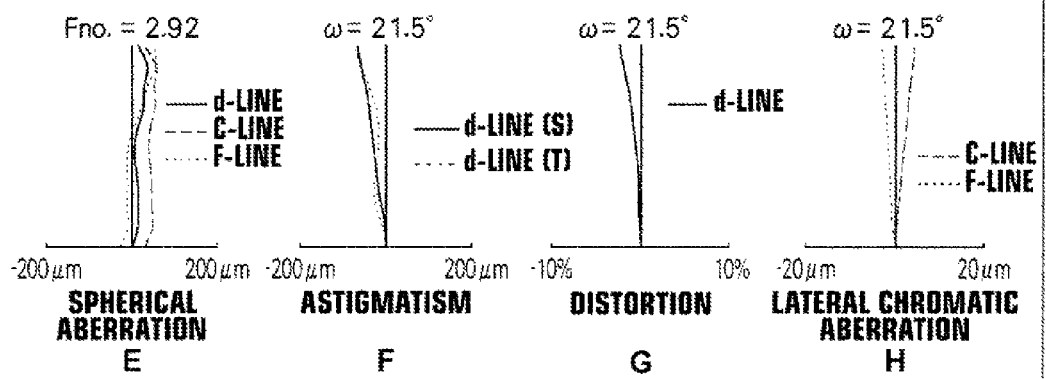
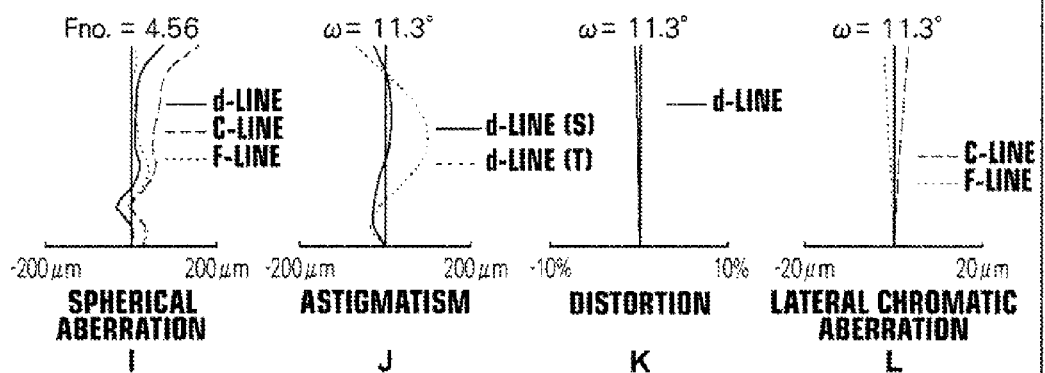

FIG.13
EXAMPLE 3
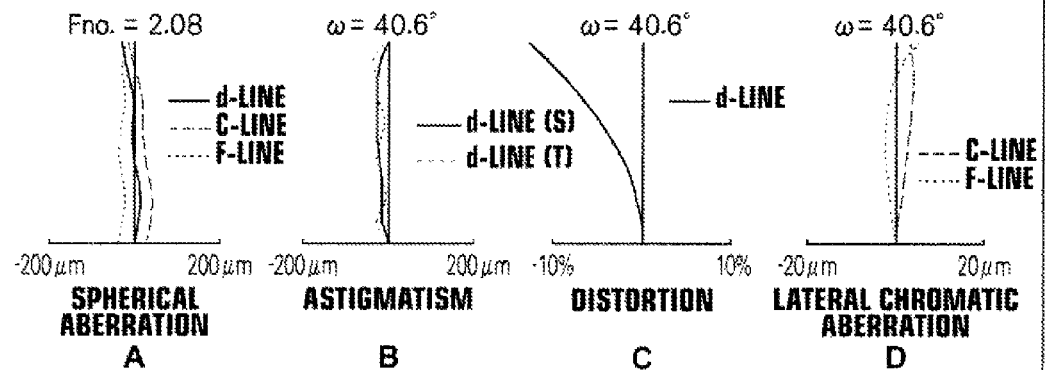
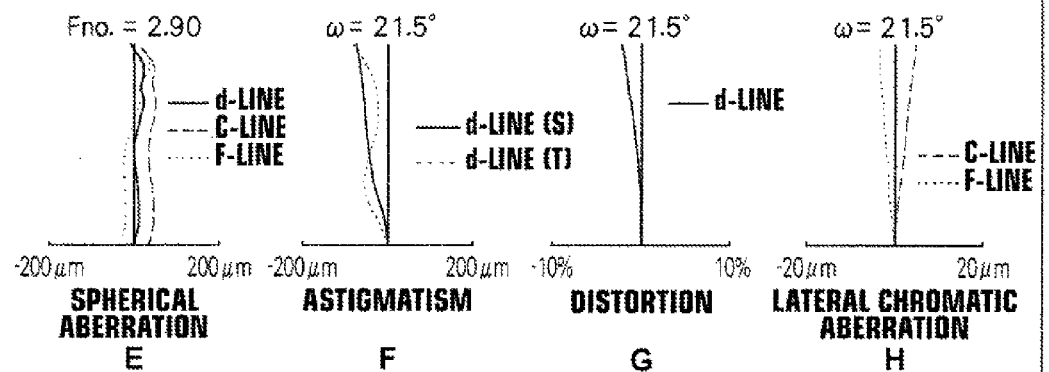
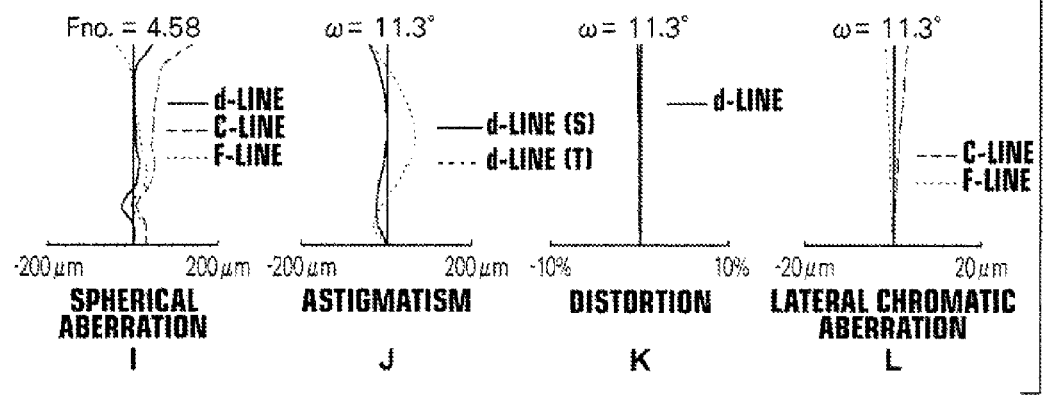

FIG.14
EXAMPLE 4
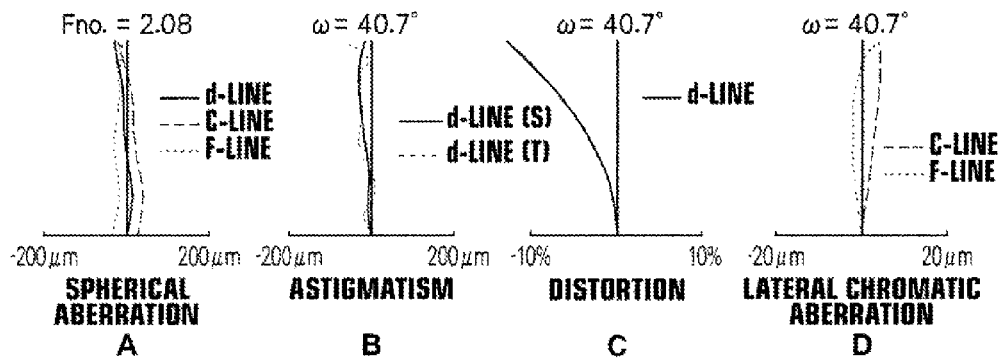
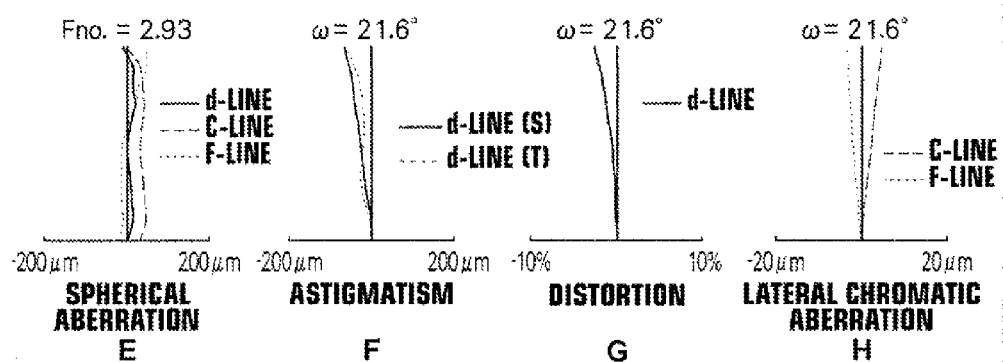
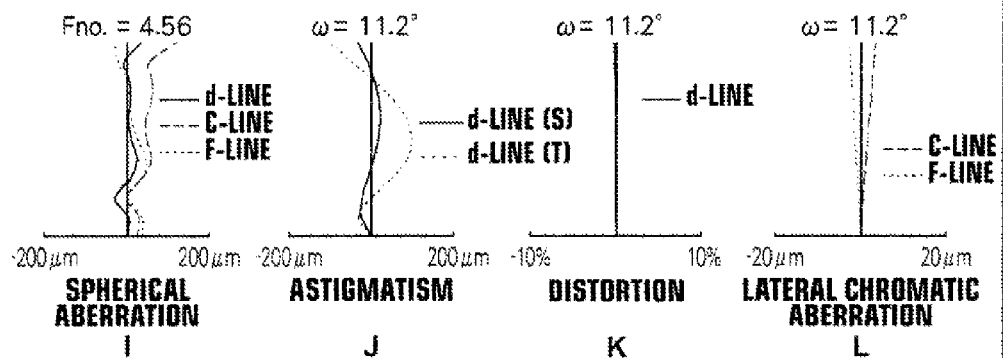

FIG.17
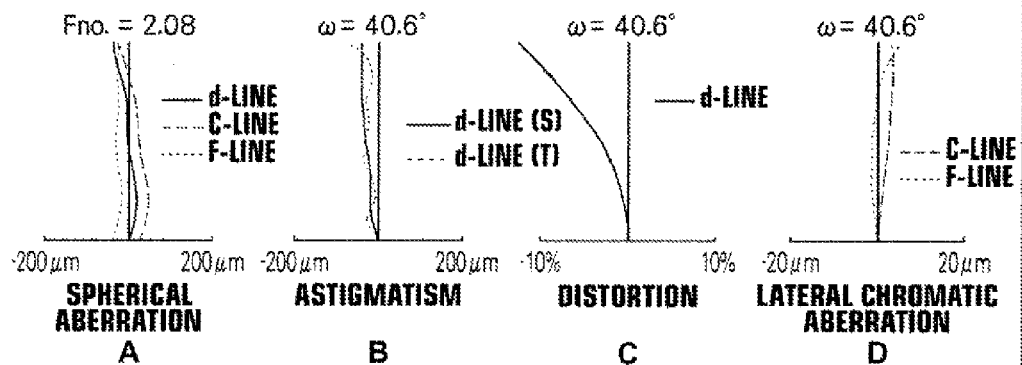
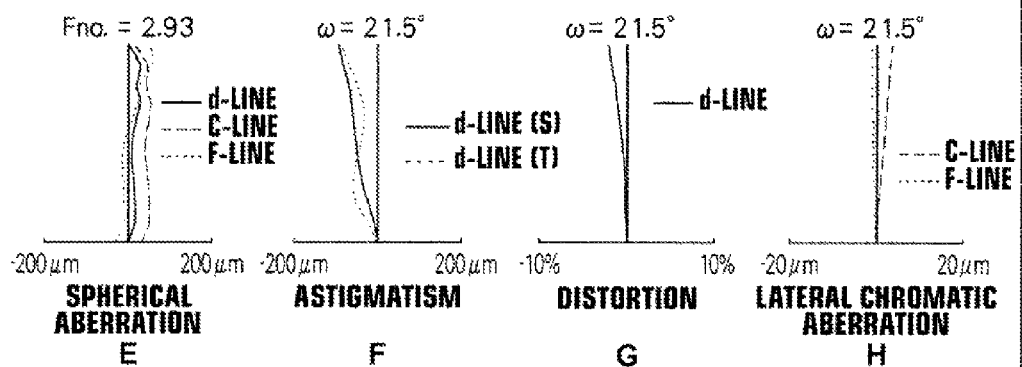
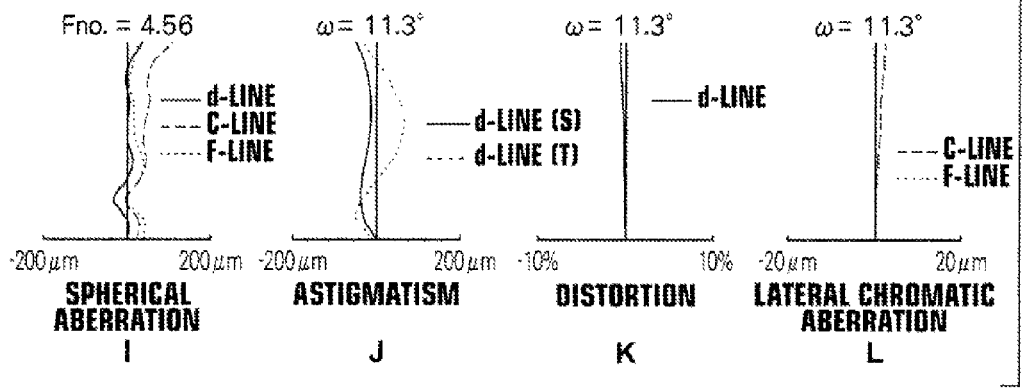

FIG.18
EXAMPLE 8
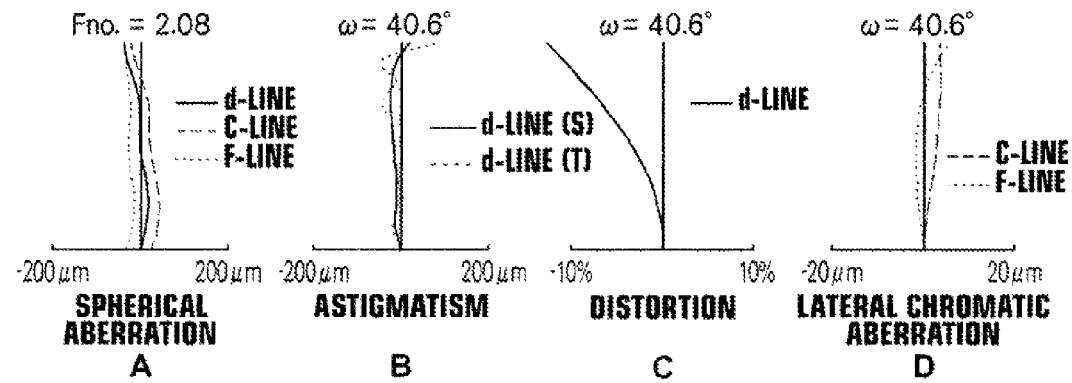
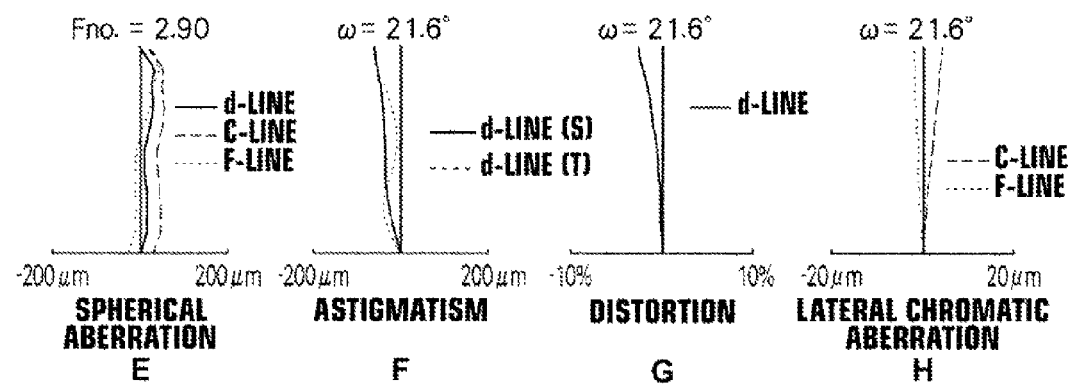
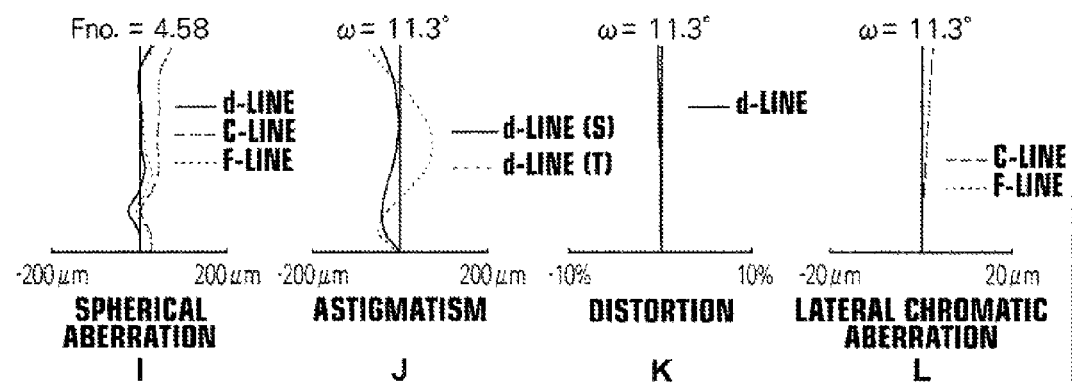

FIG.19
EXAMPLE 9
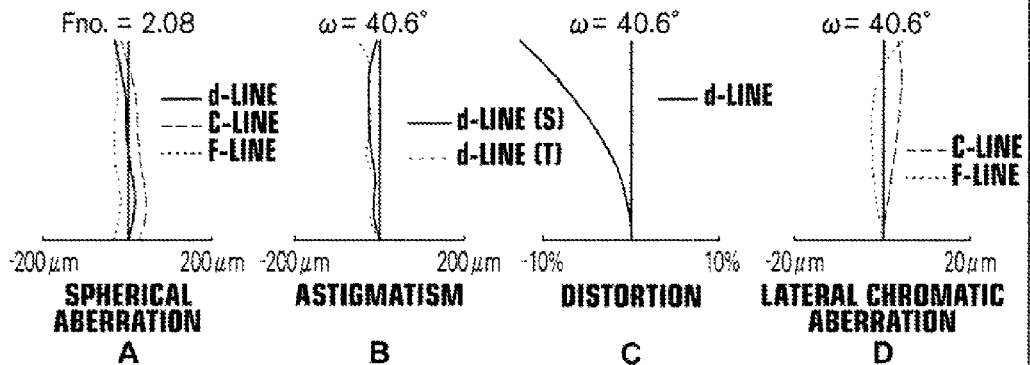
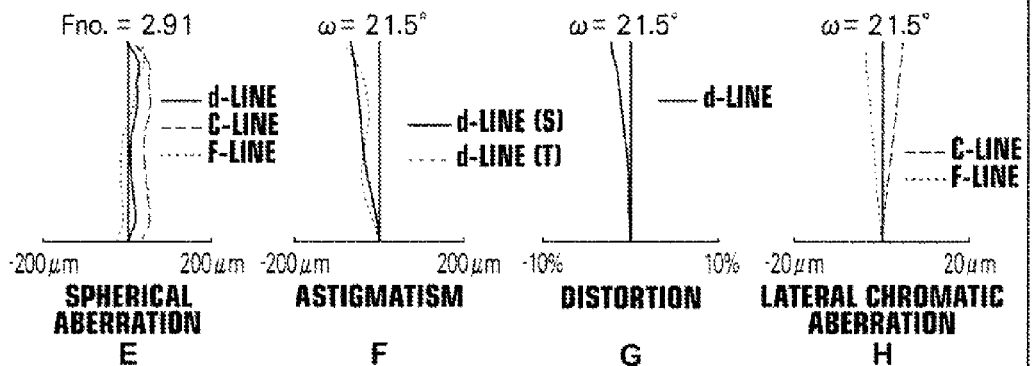
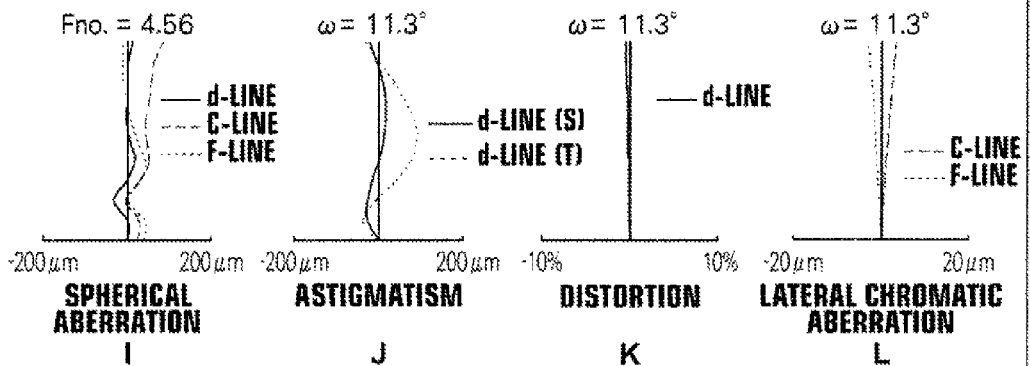

FIG.20
EXAMPLE 10
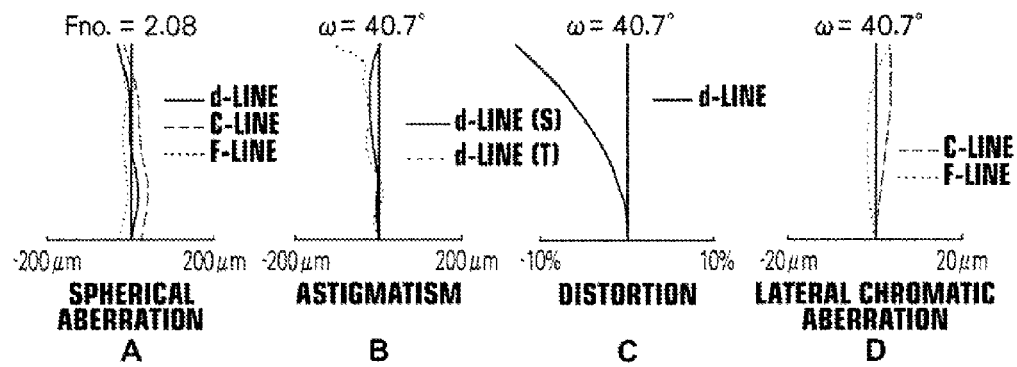
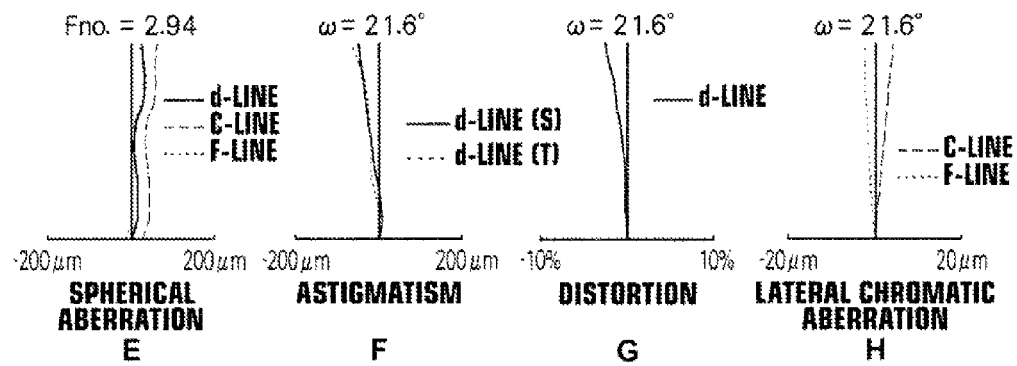
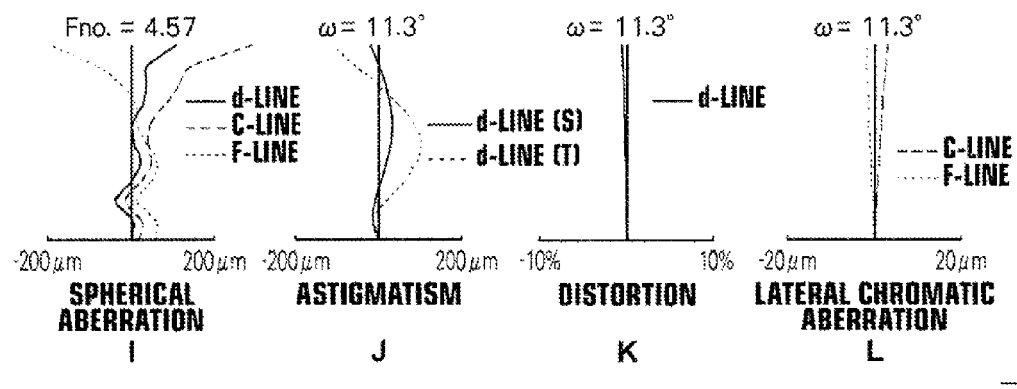

ZOOM LENS AND IMAGING APPARATUS

CROSS-REFERENCE TO RELATED APPLICATIONS

This application is a Continuation of PCT International Application No. PCT/JP2012/007823 filed on Dec. 6, 2012, which claims priority under 35 U.S.C §119 (a) to Japanese Patent Application No. 2011-269674 filed on Dec. 9, 2011. Each of the above applications is hereby expressly incorporated by reference, in its entirety, into the present application.

TECHNICAL FIELD

The present invention relates to a zoom lens and an imaging apparatus, and more particularly to a zoom lens that is suitable for use with a digital camera, a video camera, etc., and an imaging apparatus provided with the zoom lens.

BACKGROUND ART

In recent years, along with the spread of personal computers in ordinary homes, digital cameras that are capable of inputting image information, such as photographed landscapes and portraits, to a personal computer are also widely spreading. Further, recent digital cameras are more and more sophisticated, and there are demands for a digital camera equipped with a zoom lens that allows successful wide-angle imaging.

In order to meet such demands, a zoom lens, such as zoom lenses disclosed in Japanese Unexamined Patent Publication Nos. 2003-107348 and 2009-156905 (hereinafter, Patent Documents 1 and 2), for example, which consists of, in order from the object side, a first lens group having a negative refractive power, a second lens group having a positive refractive power and a third lens group having a positive refractive power, where magnification change is achieved by changing an interval between the groups, is used. Further, Japanese Unexamined Patent Publication No. 2011-081185 (hereinafter, Patent Document 3) discloses a zoom lens that has a similar basic configuration to those of Patent Documents 1 and 2 and has a small F-number at the wide-angle end.

DISCLOSURE OF INVENTION

In recent years, however, there are increasing demands for a zoom lens that is a wide angle lens and is capable of achieving a small F-number and reduction of the entire length of the zoom lens. The zoom lenses disclosed in Patent Documents 1 and 2 have a large F-number at the wide-angle end, and therefore a lens having a smaller F-number is demanded. The zoom lens disclosed in Patent Document 3 has a large ratio of the entire length of the lens to the image size, and therefore reduction of the entire length of the lens is demanded.

In view of the above-described circumstances, the present invention is directed to providing a zoom lens that is a wide-angle lens and has high optical performance for achieving a small F-number and reduction of the entire length of the zoom lens, and an imaging apparatus provided with the zoom lens.

The zoom lens of the invention substantially consists of three lens groups including, in order from an object side, a first lens group having a negative refractive power, a second lens group having a positive refractive power and a third lens group having a positive refractive power, wherein, during magnification change from a wide-angle end to a telephoto end, at least the first lens group and the second lens group are moved along an optical axis such that an interval between the first lens group and the second lens group is decreased and an interval between the second lens group and the third lens group is increased, the second lens group consists of, in order from the object side, a second-group first lens having a positive refractive power, a cemented lens consisting of a second-group second lens having a positive refractive power and a second-group third lens having a negative refractive power, a second-group fourth lens having a positive refractive power, and a second-group fifth lens having a negative refractive power, and the conditional expressions (1) and (2) below are satisfied:

$$-0.9 < fw/f25 < 0 \quad (1), \text{ and}$$

$$-0.40 < (R15+R16)/(R15-R16) < 2.40 \quad (2),$$

where fw is a focal length of the entire lens system at the wide-angle end, f25 is a focal length of the second-group fifth lens, R15 is a paraxial radius of curvature of an object-side surface of the second-group fifth lens, and R16 is a paraxial radius of curvature of an image-side surface of the second-group fifth lens.

It should be noted that, in the invention, the "lens group" as used herein refers not only a lens group formed by a plurality of lenses but also a lens group formed by only one lens.

It should be noted that the expression "substantially consists (consisting) of three lens groups" as used herein means that the zoom lens of the invention may include: a lens substantially without any power; optical elements other than lenses, such as a stop and a glass cover; and mechanical components, such as a lens flange, a lens barrel, an image sensor, and a camera shake correcting mechanism; in addition to the three lens groups.

It is more preferable that the zoom lens of this embodiment satisfies the conditional expressions (1-1) and (2-1) below:

$$-0.78 < fw/f25 < -0.14 \quad (1\text{-}1), \text{ and}$$

$$-0.35 < (R15+R16)/(R15-R16) < 0.30 \quad (2\text{-}1)$$

where fw is a focal length of the entire lens system at the wide-angle end, f25 is a focal length of the second-group fifth lens, R15 is a paraxial radius of curvature of the object-side surface of the second-group fifth lens, and R16 is a paraxial radius of curvature of the image-side surface of the second-group fifth lens.

It is preferable that the zoom lens of this embodiment satisfies the conditional expression (3) below, or it is more preferable that the zoom lens of this embodiment satisfies the conditional expression (3-1) below:

$$0.02 < D14/fw < 0.3 \quad (3), \text{ or}$$

$$0.09 < D14/fw < 0.25 \quad (3\text{-}1)$$

where D14 is an interval between the second-group fourth lens and the second-group fifth lens along the optical axis, and fw is a focal length of the entire lens system at the wide-angle end.

It is preferable that the zoom lens of this embodiment satisfies the conditional expression (4) below, or it is more preferable that the zoom lens of this embodiment satisfies the conditional expression (4-1) below:

$$0.15 < D12/fw < 0.6 \quad (4), \text{ or}$$

$$0.20 < D12/fw < 0.52 \quad (4\text{-}1)$$

where D12 is an interval between the second-group third lens and the second-group fourth lens along the optical axis, and fw is a focal length of the entire lens system at the wide-angle end.

In the zoom lens of this embodiment, it is preferable that each of the second-group first lens and the second-group fourth lens has an aspherical surface on at least one side thereof.

It is preferable that the zoom lens of this embodiment satisfies the conditional expression (5) below:

$$\omega > 38 \quad (5),$$

where $\omega$ is a half angle of view at the wide-angle end.

The imaging apparatus of the invention comprises the above-described zoom lens of the invention.

According to the zoom lens of the invention, which substantially consists of three lens groups including, in order from the object side, a first lens group having a negative refractive power, a second lens group having a positive refractive power and a third lens group having a positive refractive power, wherein, during magnification change from the wide-angle end to the telephoto end, at least the first lens group and the second lens group are moved along the optical axis such that an interval between the first lens group and the second lens group is decreased and an interval between the second lens group and the third lens group is increased, configuring the second lens group to consist of, in order from the object side, a second-group first lens having a positive refractive power, a cemented lens consisting of a second-group second lens having a positive refractive power and a second-group third lens having a negative refractive power, a second-group fourth lens having a positive refractive power and a second-group fifth lens having a negative refractive power allows achieving a wide-angle zoom lens having high optical performance for achieving a small F-number and reduction of the entire length of the zoom lens. As a result, a zoom lens that can achieve an image size lager than a conventional image size relative to the entire length of the zoom lens can be provided while achieving reduction of the entire length of the zoom lens.

According to the zoom lens of the invention, when the conditional expression (1) is satisfied, the power of the second group can be successfully maintained, and reduction of the entire length of the zoom lens and a small F-number can be achieved. Further, when the zoom lens of the invention satisfies the conditional expression (1-1), a more remarkable level of the above-described effects can be obtained.

Further, in the case where the zoom lens of the invention satisfies the conditional expression (2), minimization of the field curvature can preferably be achieved. Further, when the zoom lens of the invention satisfies the conditional expression (2-1), a more remarkable level of the above-described effect can be obtained.

Further, in the case where each of the second-group first lens and the second-group fourth lens has an aspherical surface on at least one side thereof, the second-group first lens having an aspherical surface on at least one side thereof allows, in particular, more preferably correcting spherical aberration, and the second-group fourth lens having an aspherical surface on at least one side thereof allows, in particular, more preferably correcting astigmatism.

Further, in the invention, in the case where the conditional expression (3) is satisfied, the power of the second lens group is preferably maintained, thereby allowing reduction of the entire length of the zoom lens and reduction of the collapsed thickness of the zoom lens while achieving successful correction of astigmatism. Further, in the invention, in the case where the conditional expression (3-1) is satisfied, a more remarkable level of the above-described effects can be obtained. In the invention, in the case where the conditional expression (4) is satisfied, the power of the second lens group is preferably maintained, thereby allowing reduction of the entire length of the zoom lens and reduction of the thickness of the zoom lens when it is retracted (the collapsed thickness) while achieving successful correction of astigmatism. Further, in the invention, in the case where the conditional expression (4-1) is satisfied, a more remarkable level of the above-described effects can be obtained. In the invention, in the case where the conditional expression (5) is satisfied, wide-angle imaging can preferably be performed.

According to the imaging apparatus of the invention, which is provided with the above-described high-performance zoom lens of the invention, the entire apparatus can be made compact, and a photographed image with higher image quality can be obtained.

BRIEF DESCRIPTION OF THE DRAWINGS

FIG. 12 shows, at "A" to "L", aberration diagrams of the zoom lens according to Example 2 of the invention, FIG. 13 shows, at "A" to "L", aberration diagrams of the zoom lens according to Example 3 of the invention, FIG. 14 shows, at "A" to "L", aberration diagrams of the zoom lens according to Example 4 of the invention, FIG. 17 shows, at "A" to "L", aberration diagrams of the zoom lens according to Example 7 of the invention, FIG. 18 shows, at "A" to "L", aberration diagrams of the zoom lens according to Example 8 of the invention, FIG. 19 shows, at "A" to "L", aberration diagrams of the zoom lens according to Example 9 of the invention, FIG. 20 shows, at "A" to "L", aberration diagrams of the zoom lens according to Example 10 of the invention.

DESCRIPTION OF PREFERRED EMBODIMENTS

Hereinafter, embodiments of the present invention will be described in detail with reference to the drawings.

Figure 1:
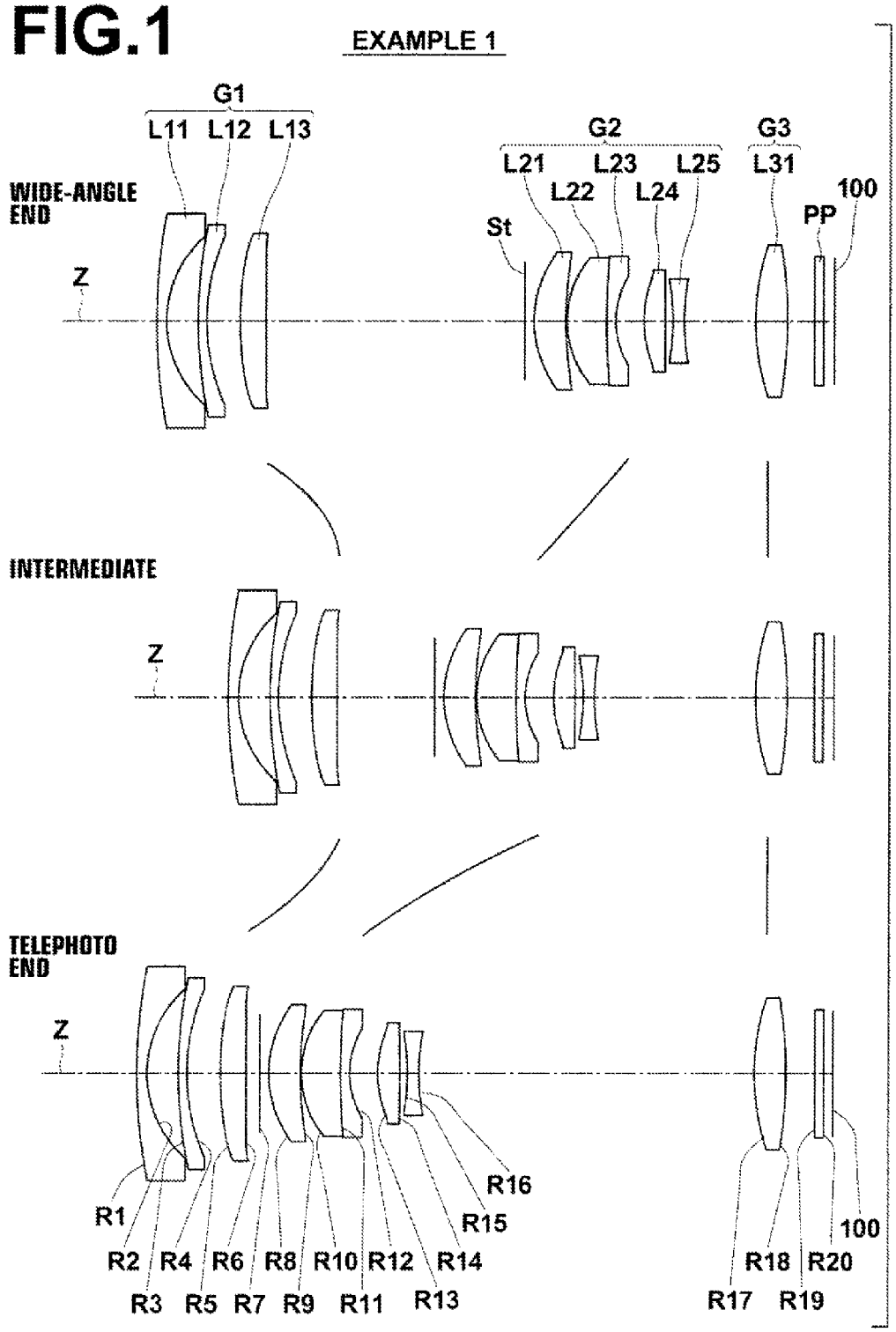
FIG. 1 is a sectional view illustrating the lens configuration of a zoom lens according to Example 1 of the invention.
Figure 2:
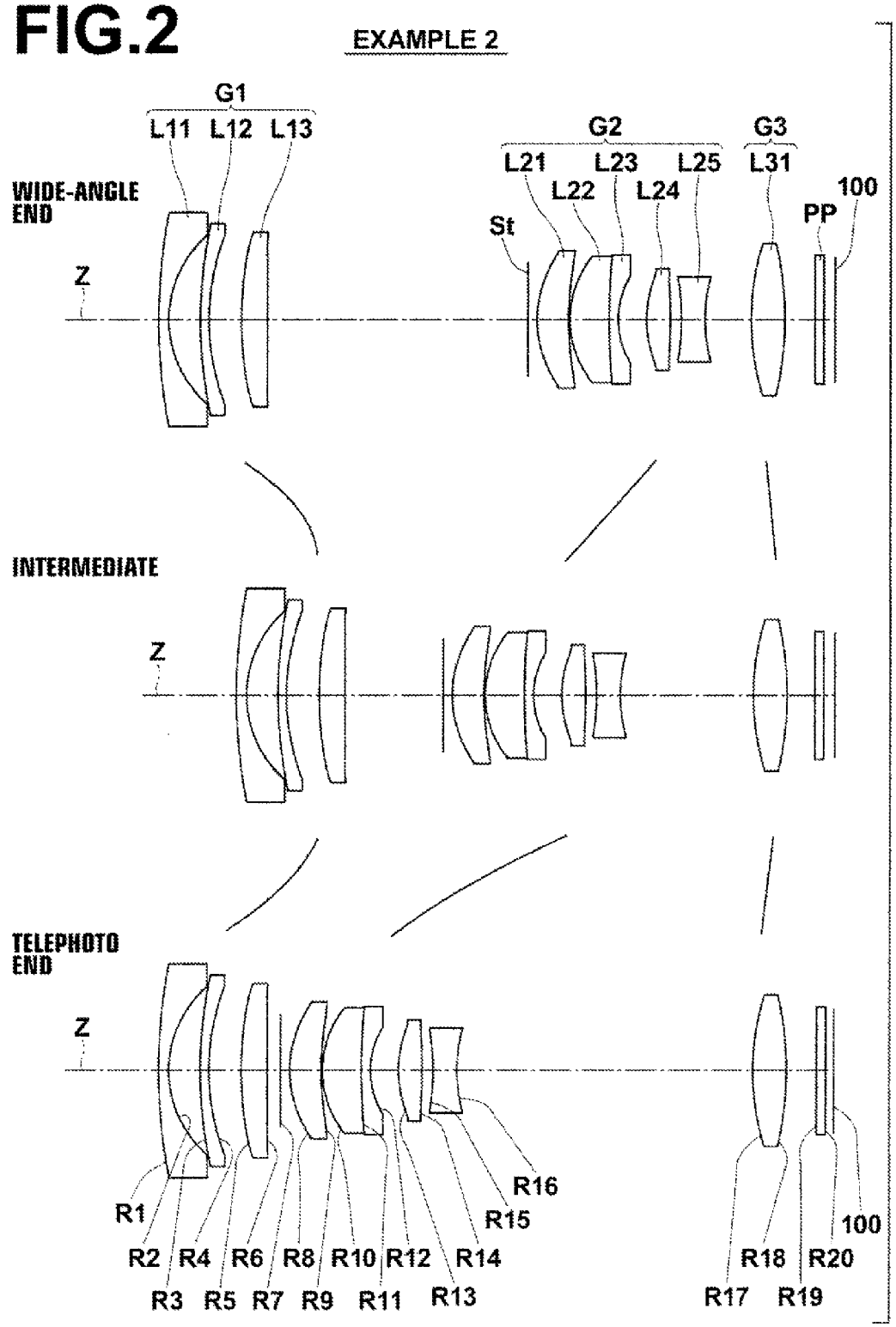
FIG. 2 is a sectional view illustrating the lens configuration of a zoom lens according to Example 2 of the invention.
Figure 3:
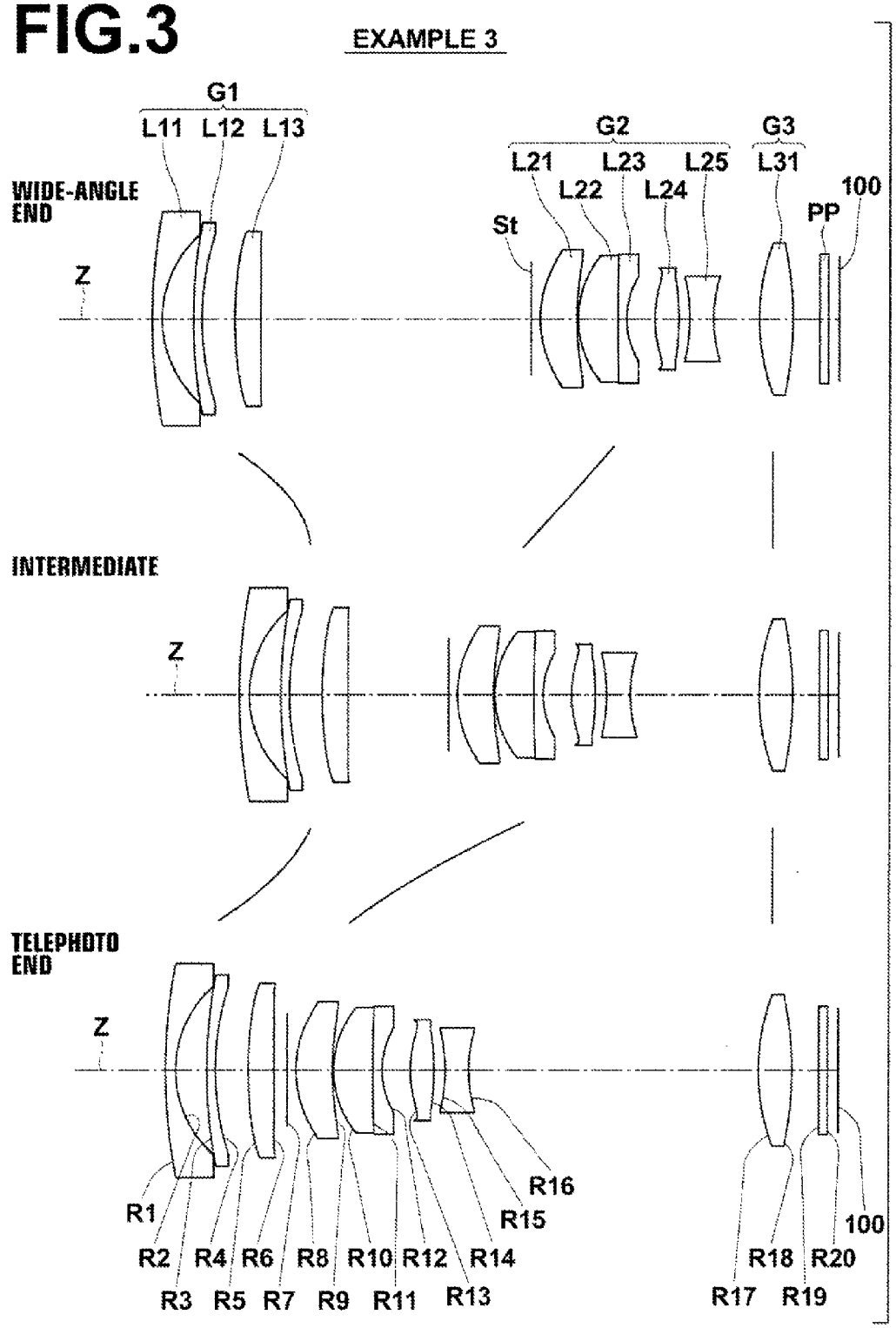
FIG. 3 is a sectional view illustrating the lens configuration of a zoom lens according to Example 3 of the invention.
Figure 4:
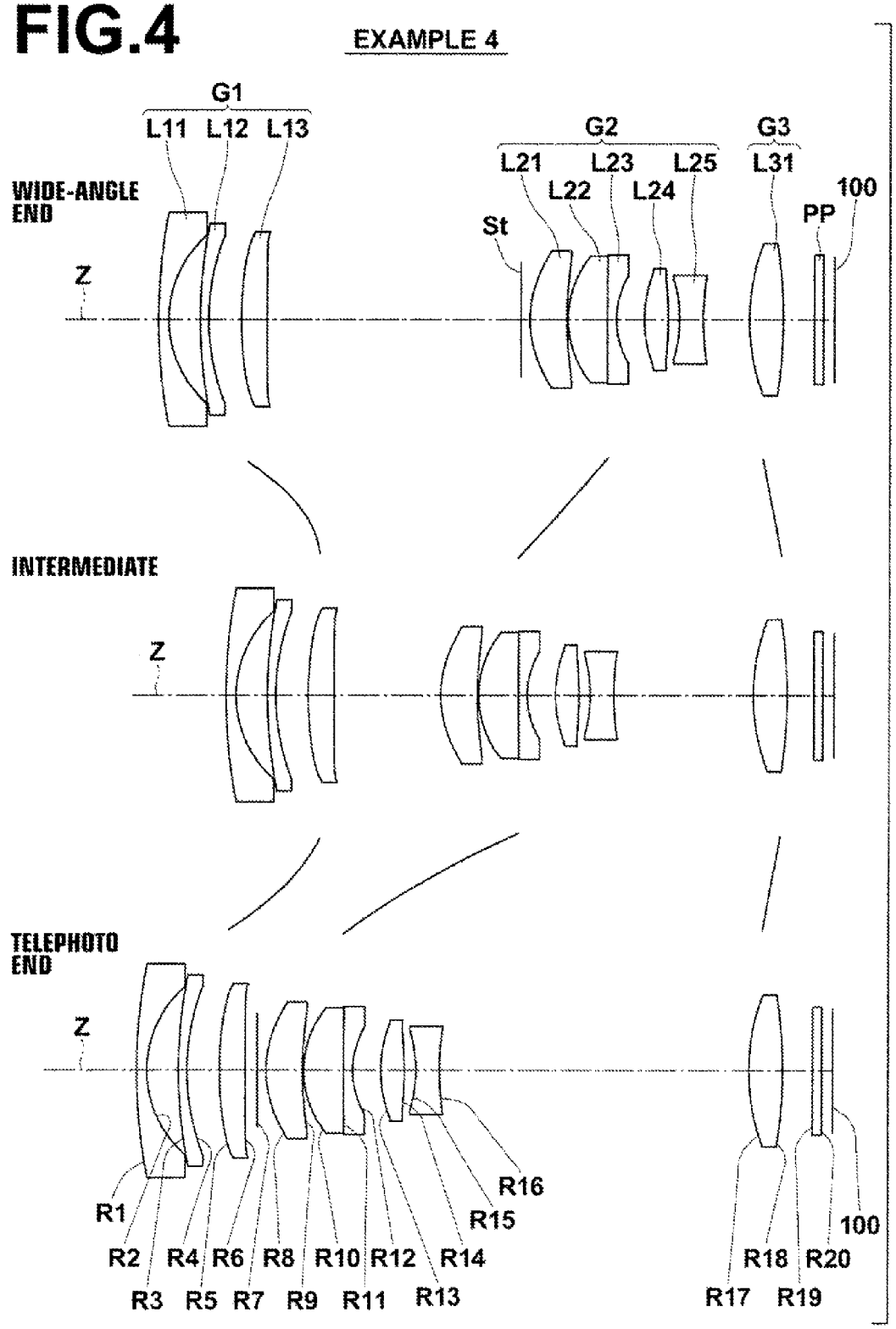
FIG. 4 is a sectional view illustrating the lens configuration of a zoom lens according to Example 4 of the invention.
Figure 5:
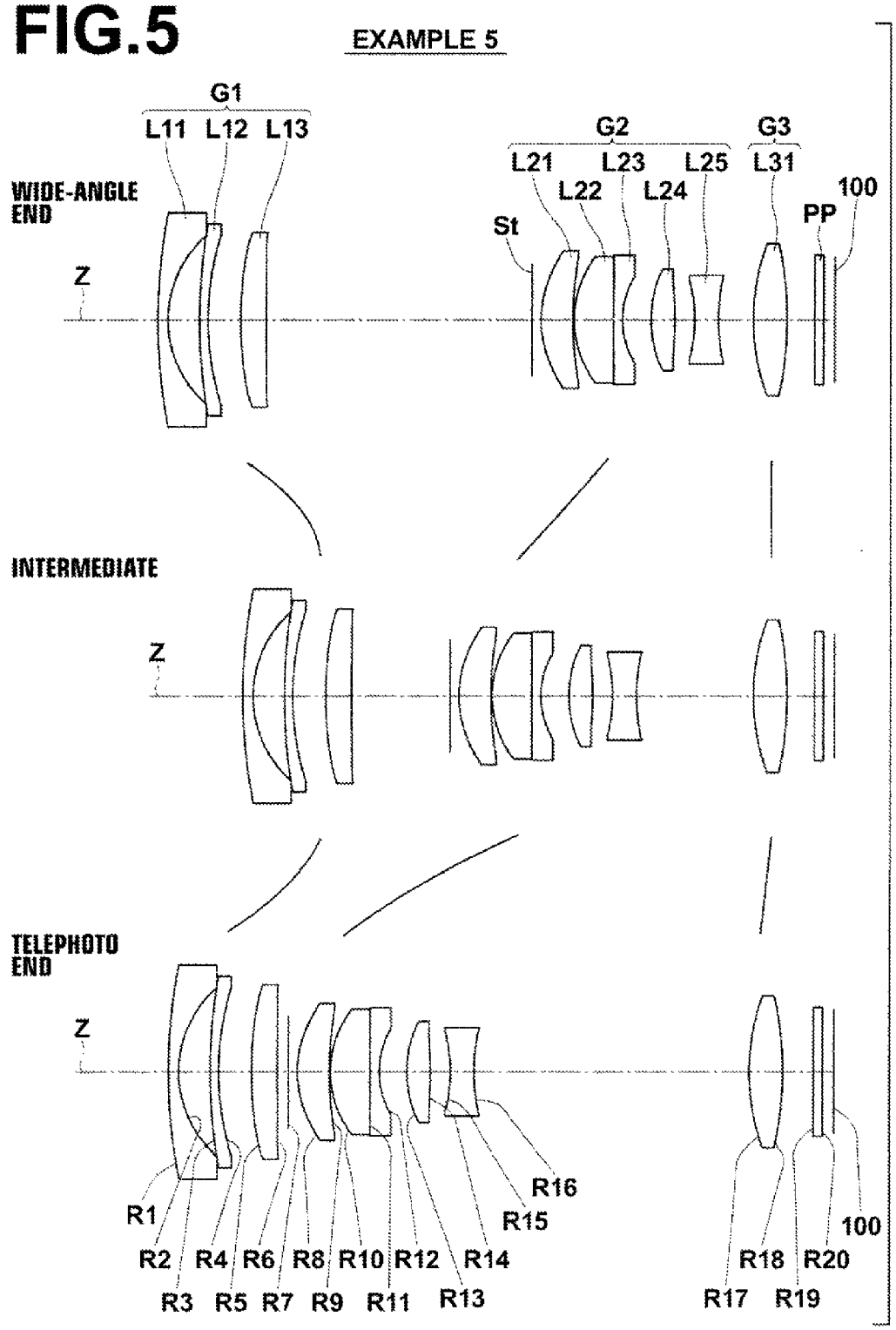
FIG. 5 is a sectional view illustrating the lens configuration of a zoom lens according to Example 5 of the invention.
Figure 6:
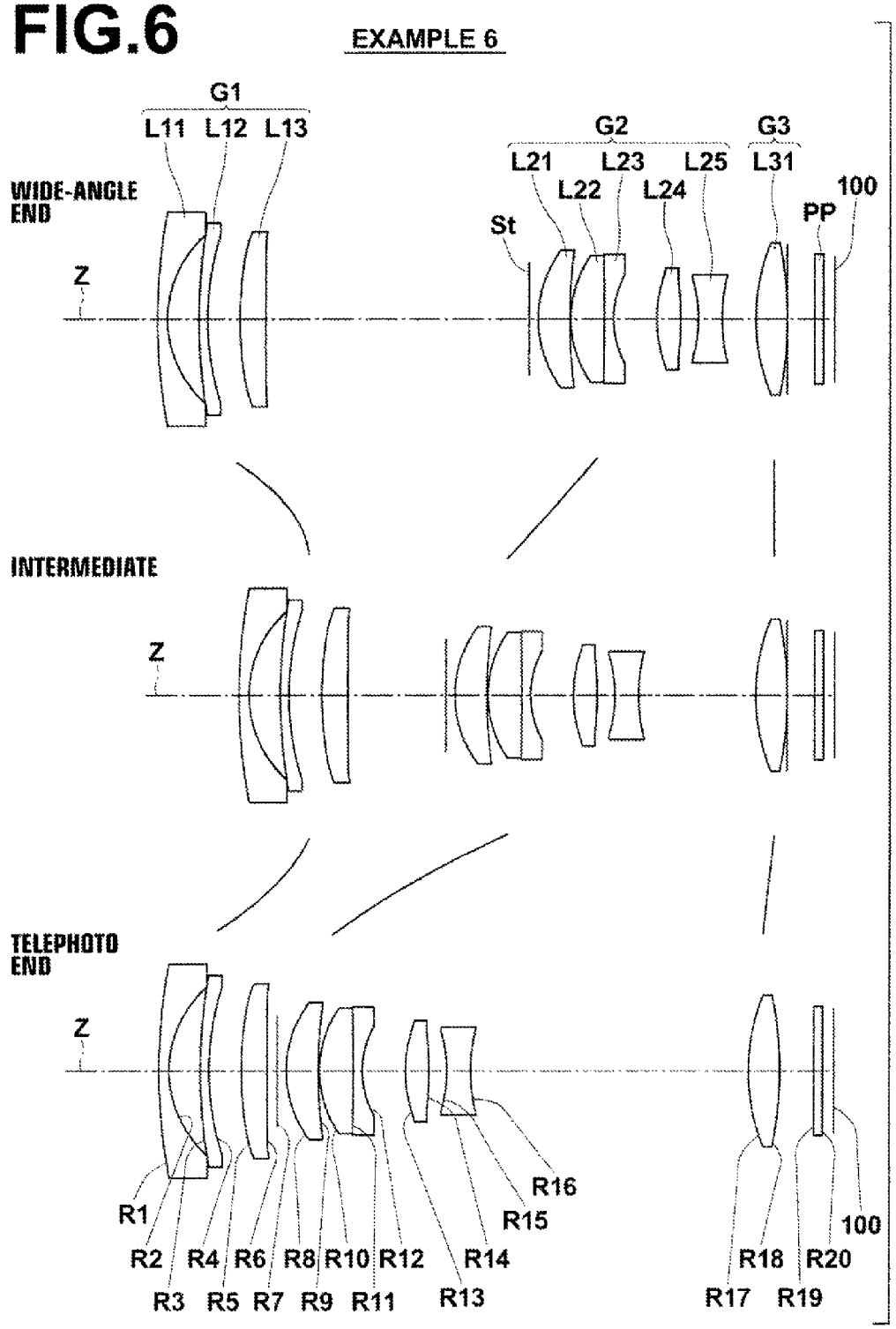
FIG. 6 is a sectional view illustrating the lens configuration of a zoom lens according to Example 6 of the invention.
Figure 7:
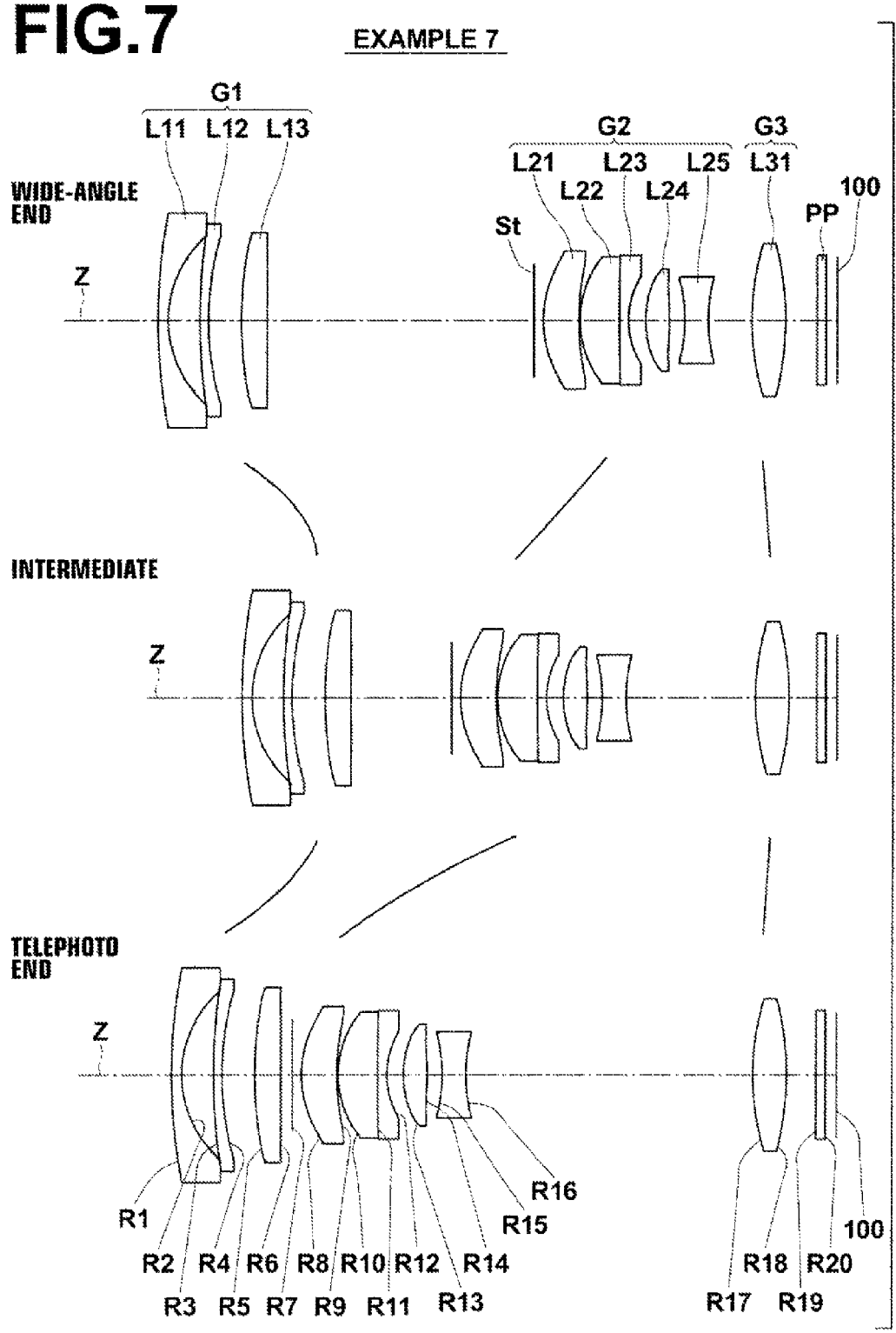
FIG. 7 is a sectional view illustrating the lens configuration of a zoom lens according to Example 7 of the invention.
Figure 8:
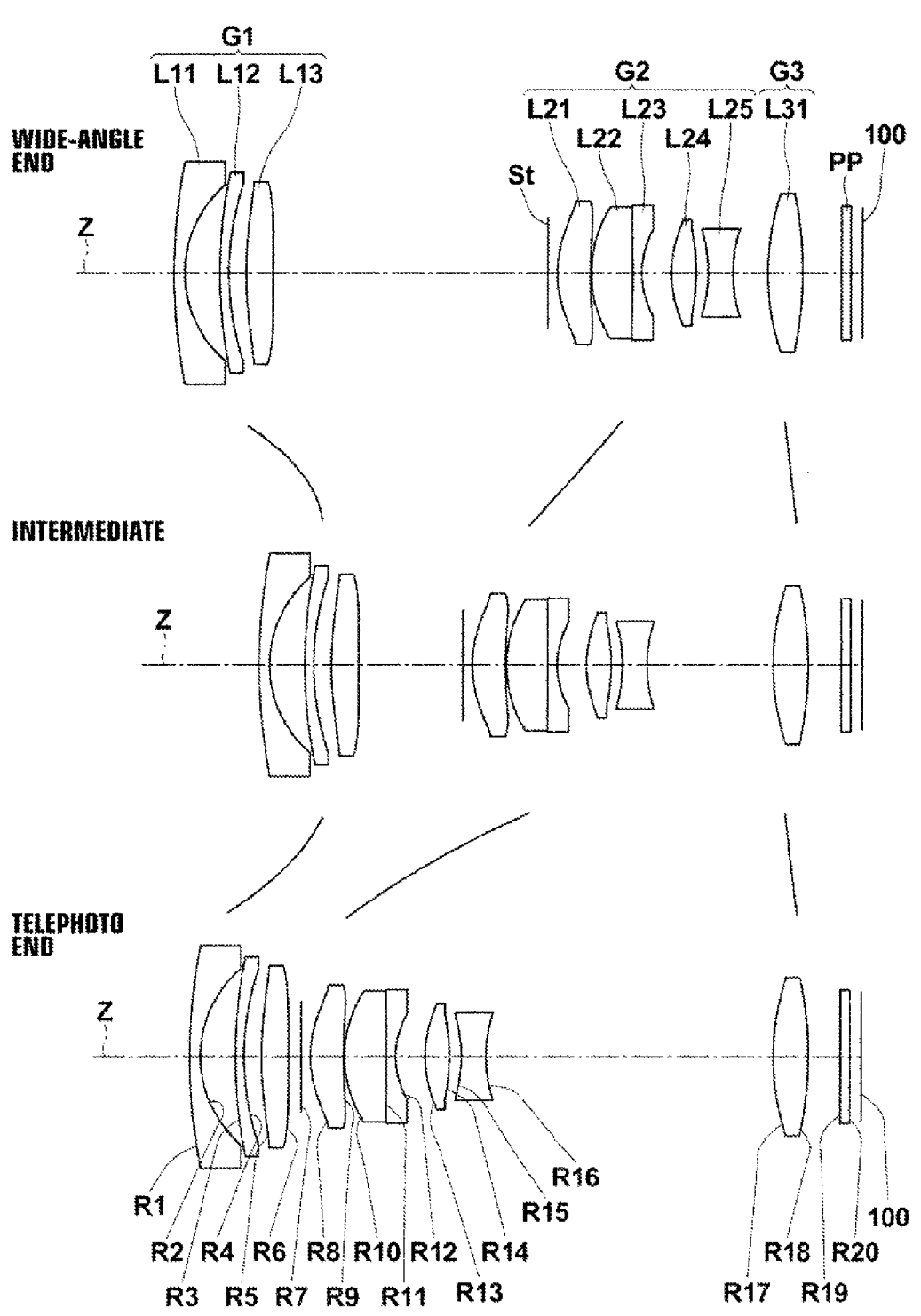
FIG. 8 is a sectional view illustrating the lens configuration of a zoom lens according to Example 8 of the invention.
Figure 9:
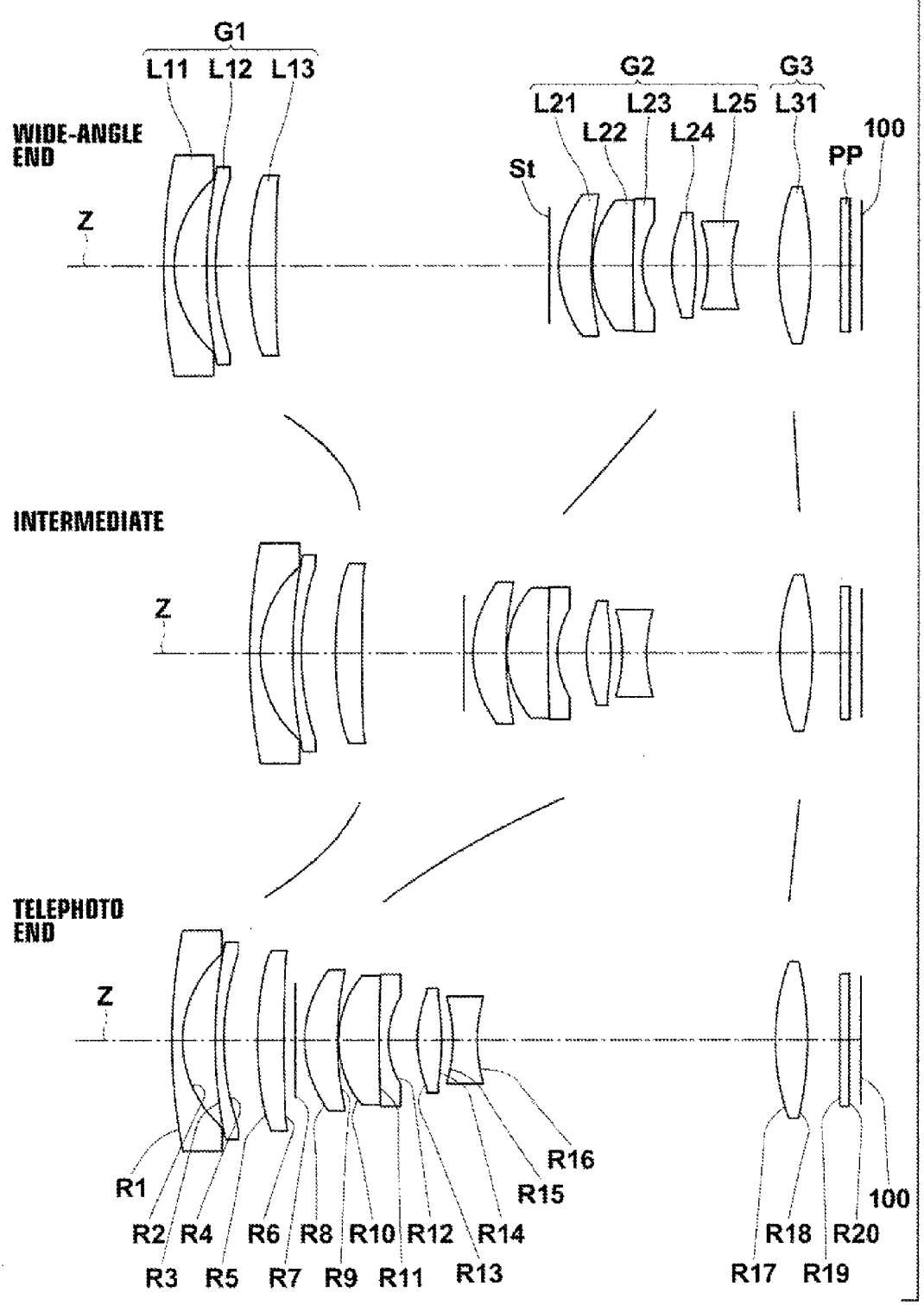
FIG. 9 is a sectional view illustrating the lens configuration of a zoom lens according to Example 9 of the invention.
Figure 10:
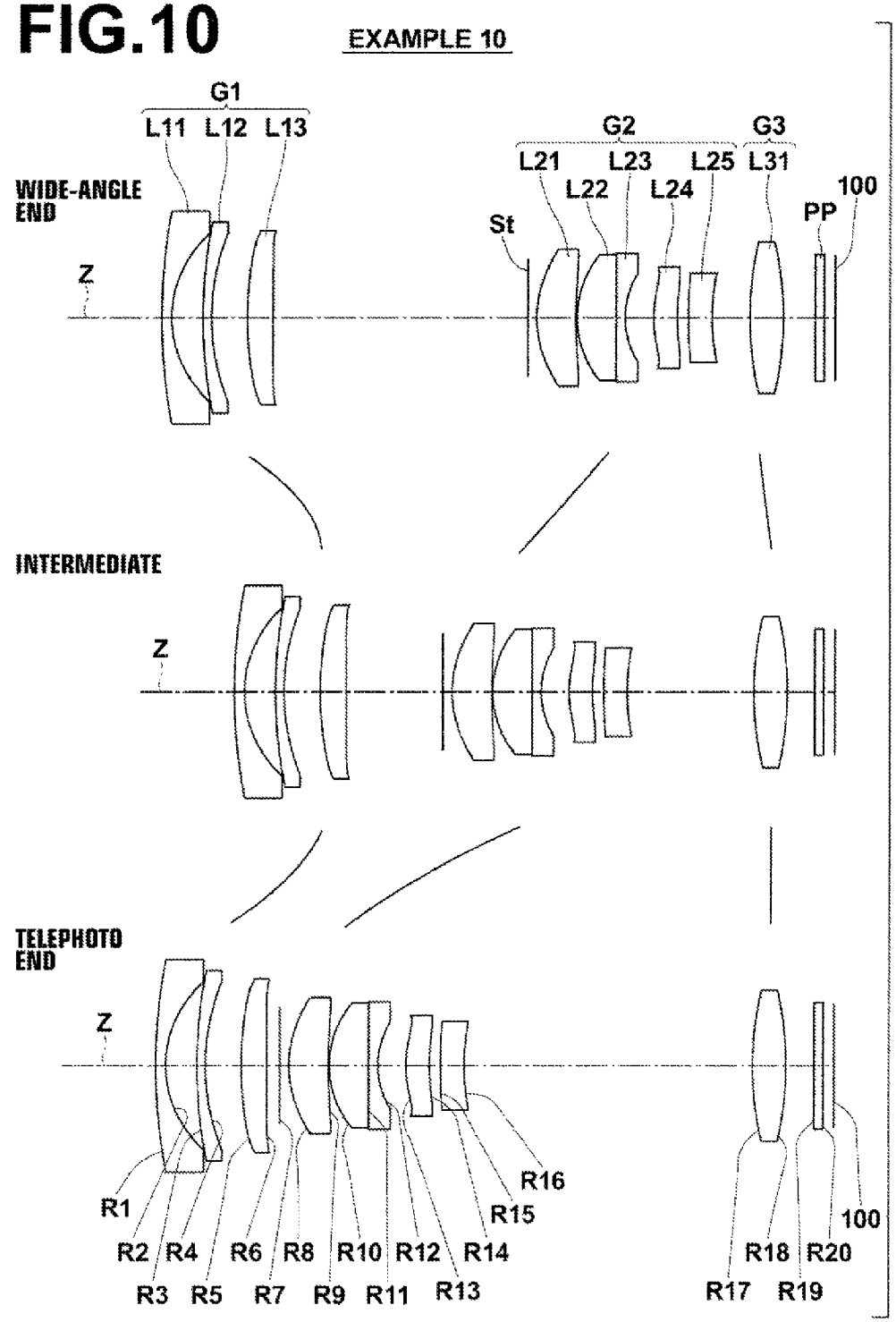
FIG. 10 is a sectional view illustrating the lens configuration of a zoom lens according to Example 10 of the invention.

FIG. 1 is a sectional view illustrating the configuration of a zoom lens according to one embodiment of the invention, and corresponds to a zoom lens of Example 1, which will be described later. FIGS. 2 to 10 are sectional views illustrating the configurations of zoom lenses of Examples 2 to 10, respectively, which will be described later. The zoom lenses shown in FIGS. 1 to 10 have the same basic configuration and are shown in the drawings in the same manner. Therefore, in the following description, the zoom lens shown in FIG. 1 is mainly explained as an example.

In FIG. 1, the left side is referred to as "object side" and the right side is referred to as "image side". In FIG. 1, an arrangement of lenses at the wide-angle end when the focus is set to infinity is shown at the top, an arrangement of lenses at an intermediate position when the focus is set to infinity is shown at the middle, and an arrangement of lenses at the telephoto end when the focus is set to infinity is shown at the bottom. Schematic trajectories of lens groups during magnification change are shown by the solid lines drawn between the top and the middle and between the middle and the bottom.

The zoom lens shown in FIG. 1 substantially consists of three lens groups, which includes, in order from the object side along an optical axis Z, a first lens group G1 having a negative refractive power, a second lens group G2 having a positive refractive power and a third lens group G3 having a positive refractive power, where, during magnification change from the wide-angle end to the telephoto end, at least the first lens group G1 and the second lens group G2 are moved along the optical axis Z such that the interval between the first lens group G1 and the second lens group G2 is decreased and the interval between the second lens group and the third lens group G3 is increased. That is, in this zoom lens, the interval between the first lens group G1 and the second lens group G2 and the interval between the second lens group G2 and the third lens group G3 are changed during magnification change from the wide-angle end to the telephoto end. Further, an aperture stop St is disposed between the first lens group G1 and the second lens group G2.

For example, in the zoom lens of the example shown in FIG. 1, the lens groups are moved along the trajectories shown by the arrows in the drawing during magnification change from the wide-angle end to the telephoto end. Also, the interval between the third lens group G3 and the imaging plane 100 is changed during the magnification change. It should be noted that, in the zoom lens of the example shown in FIG. 1, the aperture stop St is configured to be moved together with the second lens group G2 during the magnification change.

The aperture stop St shown in FIG. 1 does not necessarily represents the size and the shape thereof, but represents the position thereof along the optical axis Z.

When the zoom lens is applied to an imaging apparatus, it is preferable that a glass cover, filters, such as an infrared cut filter and a low-pass filter, etc., are provided between the most image-side lens and the imaging plane (imaging surface) 100 depending on the configuration of a camera on which the lens is mounted. In the example shown in FIG. 1, a parallel plate-like optical member PP that is assumed to represent the above-mentioned elements is disposed on the image side of the third lens group G3.

It should be noted that, in the example shown in FIG. 1, when this zoom lens is applied to an imaging apparatus, for example, the zoom lens is disposed such that the imaging surface of the image sensor is positioned in the imaging plane 100.

Now, the configuration of each lens group of the zoom lens shown in FIG. 1 is described in detail.

The first lens group G1 as a whole has a negative refractive power. In this example, the first lens group G1 includes, in order from the object side, a first-group first lens L11 which is a meniscus lens having a negative refractive power with the convex surface facing the object side, a first-group second lens L12 which is a meniscus lens having a negative refractive power with the convex surface facing the object side, and a first-group third lens L13 having a positive refractive power with the convex surface facing the object side. In this example, the first-group third lens L13 have aspherical surfaces on both sides thereof.

The second lens group G2 as a whole has a positive refractive power. The second lens group G2 includes, in order from the object side, a second-group first lens L21 having a positive refractive power, a cemented lens formed by a second-group second lens L22 having a positive refractive power and a second-group third lens having a negative refractive power L23, a second-group fourth lens L24 having a positive refractive power, and a second-group fifth lens L25 having a negative refractive power. In the second lens group G2, it is preferable that at least one surface of each of the second-group first lens L21 and the second-group fourth lens L24l is an aspherical surface lens. In this example, each of the second-group first lens L21 and the second-group fourth lens L24 has aspherical surfaces on both sides thereof.

The third lens group G3 as a whole has a positive refractive power. The third lens group G3 includes a third-group first lens L31 having a positive refractive power.

This zoom lens is adapted to satisfy the conditional expressions (1) and (2) below:

$$-0.9 < fw/f25 < 0 \tag{1}$$

and $$-0.40 < (R15+R16)/(R15-R16) < 2.40 \tag{2},$$

where fw is a focal length of the entire lens system at the wide-angle end, f25 is a focal length of the second-group fifth lens, R15 is a paraxial radius of curvature of the object-side surface of the second-group fifth lens, and R16 is a paraxial radius of curvature of the image-side surface of the second-group fifth lens.

It is preferable that this zoom lens further satisfies the conditional expressions (3) to (5) below:

$$0.02 < D14/fw < 0.3 \tag{3},$$

$$0.15 < D12/fw < 0.6 \tag{4}$$

and $$\omega > 38 \tag{5},$$

where D14 is an interval between the second-group fourth lens and the second-group fifth lens along the optical axis, D12 is an interval between the second-group third lens and the second-group fourth lens along the optical axis, fw is a focal length of the entire lens system at the wide-angle end, and w is a half angle of view at the wide-angle end. As preferred aspects, the zoom lens may satisfy any one or any combination of the conditional expressions (3) to (5).

In this zoom lens, as a material disposed on the most object side, specifically, it is preferable to use glass. Alternatively, a transparent ceramic may be used.

As a material forming a lens with an aspherical surface, glass may be used, or a plastic can also be used. In a case where a plastic is used, weight reduction and cost reduction can be achieved.

It is preferable that the zoom lens is provided with a multi-layer protective coating. Besides the protective coating, the zoom lens may be provided with an anti-reflection coating film for reducing ghost light, etc., during use.

In the example shown in FIG. 1, the optical member PP is disposed between the lens system and the imaging plane. However, the various filters, such as a lowpass filter and a filter that cuts off a specific wavelength range, etc., may be disposed between the lenses, or, in place of disposing the various filters, coatings having the same functions as the various filters may be applied to the lens surfaces of some of the lenses.

The aperture stop St may be disposed at any position between the most image-side surface in the first lens group and the most image-side surface in the second lens group, and whether or not the aperture stop St is moved is not limited to that in the above-described example. For example, the aperture stop may be fixed during magnification change or may be moved separately from the lens groups during magnification change.

Operation and effect of the zoom lens having the above-described configuration is described.

As described above, the zoom lens shown in FIG. 1 includes, in order from the object side, the first to third lens groups that are negative, positive and positive lens groups, wherein, during magnification change from the wide-angle end to the telephoto end, an interval between the lens groups is changed such that at least the first lens group and the second lens group are moved along the optical axis and an interval between the first lens group and the second lens group is decreased and an interval between the second lens group and the third lens group is increased, and the second lens group includes, in order from the object side, the second-group first lens having a positive refractive power, the cemented lens formed by the second-group second lens having a positive refractive power and the second-group third lens having a negative refractive power, the second-group fourth lens having a positive refractive power, and the second-group fifth lens having a negative refractive power. This configuration allows providing a wide-angle zoom lens having high optical performance for achieving a small F-number and reduction of the entire length of the zoom lens. In particular, the second lens group G2 having the five-lens configuration preferably allows achieving a small F-number, and the second-group fifth lens L25 having a negative refractive power lens preferably allows achieving the reduction of the entire length of the lens system. In contrast, the zoom lenses of Patent Documents 1 and 2, for example, have a large F-number at the wide-angle end.

Further, according to the above-described configuration, the power of each lens group can be optimized. This allows achieving a zoom lens that can accommodate an image size, such as a ⅔-inch type image size, larger than a conventional image size, while achieving the reduction of the entire length of the zoom lens. With this, a demand in development for applying a larger size image sensor to provide higher image quality of a digital camera, or the like, can be met. In contrast, the zoom lens disclosed in Patent Document 3, for example, has an excessively long entire length of the zoom lens relative to the image size, and cannot achieve an image size corresponding to a large image sensor, such as a ⅔-inch type image sensor, while maintaining a compact entire length of the zoom lens.

The configuration of the first lens group G1 including the first-group first lens L11 which is a meniscus lens having a negative refractive power with the convex surface facing the object side, the first-group second lens L12 which is a meniscus lens having a negative refractive power with the convex surface facing the object side and the first-group third lens L13 having a positive refractive power with the convex surface facing the object side allows reducing the thickness (length in the optical axis direction) of the first lens group G1 and achieving reduction of the entire length of the zoom lens. The first-group third lens L13 having an aspherical surface at least on one side thereof allows successful correction of astigmatism across the entire zoom range and distortion at the wide-angle end. Further, in the zoom lens shown in FIG. 1, the first-group third lens L13 has aspherical surfaces on both sides thereof. This more preferably allows correcting the astigmatism across the entire zoom range and the distortion at the wide-angle end.

In the second lens group G2, the second-group second lens L22 having a positive refractive power and the second-group third lens L23 having a negative refractive power are cemented together to form the cemented lens, thereby making the interval between the second-group second lens L22 and the second-group third lens L23 almost zero. This allows minimizing occurrence of the "half blur" problem, where good focusing characteristics cannot be obtained at a part of a photographed image due to the second-group second lens L22 and the second-group third lens L23 being eccentrically disposed at positions out of intended positions thereof. In addition, in the case where the second-group second lens L22 and the second-group third lens L23 are cemented together to form the cemented lens, the maximum limit of size and the minimum limit of size to be met is those of the cemented lens, which is the total of the second-group second lens L22 and the second-group third lens L23, and this facilitates quality control in production. In contrast, in a case where the second-group second lens L22 and the second-group third lens L23 are not cemented together, it is necessary to produce each lens such that the maximum limit of size and the minimum limit of size of each lens are individually met.

Further, in the case where each of the second-group first lens and the second-group fourth lens has an aspherical surface on at least one side thereof, the second-group first lens having an aspherical surface on at least one side thereof allows, in particular, more preferably correcting spherical aberration, and the second-group fourth lens having an aspherical surface on at least one side thereof allows, in particular, more preferably correcting astigmatism. In FIG. 1, each of the second-group first lens and the second-group fourth lens has aspherical surfaces on both sides thereof, and therefore correction of the spherical aberration and the astigmatism can be more preferably achieved.

The third lens group G3 having a one-lens configuration can preferably contribute to reduction of the entire length of the zoom lens. In addition, by minimizing the number of lens forming the third lens group G3, cost reduction can be achieved.

The conditional expression (1) defines a preferable range of the ratio of the focal length fw of the entire zoom lens at the wide-angle end to the focal length f25 of the second-group fifth lens L25. If the lower limit of the conditional expression (1) is not reached, the power of the second-group fifth lens L25 tends to be strong and the power of the second lens group G2 tends to be weak, and it is difficult to achieve a lens configuration that can provide a small F-number. In order to achieve a small F-number, one may consider increasing the length (thickness) of the second-group fifth lens L25 along the optical axis. However, this is likely to result in increase of the entire length of the zoom lens and therefore is not preferable. If it is attempted to achieve a configuration that can provide a small F-number and reduction of the entire length of the zoom lens when the lower limit of the conditional expression (1) is not reached, it is difficult to sufficiently minimize the field curvature. On the other hand, if the upper limit of the conditional expression (1) is exceeded, the power of the second-group fifth lens L25 is weak. In this case, it is difficult to correct spherical aberration occurring in the second lens group G2, and correction of astigmatism is not easy. When the second-group fifth lens L25 and the other lens groups are adapted to satisfy the conditional expression (1), successful correction of the field curvature, the spherical aberration and the astigmatism can be achieved, and a small F-number of the zoom lens can be achieved while minimizing increase of the entire length of the zoom lens. In this view, it is preferable for providing higher optical performance that the numerical range for the conditional expression (1) is as follows:

$$-0.78 < fw/f25 < -0.14 \qquad (1\text{-}1).$$

The conditional expression (2) defines a preferred range of the paraxial radius of curvature R15 on the image side and the paraxial radius of curvature R16 on the object side of the second-group fifth lens L25 in the second lens group G2. If the lower limit of the conditional expression (2) is not reached, tendency of a field curvature in the "under" (or negative) direction is high and this is not preferable. On the other hand, if the upper limit of the conditional expression (2) is exceeded, tendency of a field curvature in the "over" (or positive) direction is high and this is not preferable. When the paraxial radius of curvature on the image side and the paraxial radius of curvature on the object side of the second-group fifth lens L25 are adapted to satisfy the conditional expression (2), successful minimization of the field curvature can be achieved. In this view, it is more preferable that the numerical range for the conditional expression (2) is as follows:

$$-0.35 < (R15+R16)/(R15-R16) < 0.30 \qquad (2\text{-}1).$$

The conditional expression (3) defines a preferable range of the ratio of the interval D14 between the second-group fourth lens L24 and the second-group fifth lens L25 in the second lens group G2 along the optical axis to the focal length fw of the entire zoom lens at the wide-angle end. If the lower limit of the conditional expression (3) is not reached, the power of the second lens group G2 tends to be weak. In this case, one may consider increasing the amount of movement of the second lens group G2 during magnification change to achieve a sufficient zoom ratio. However, this also results in increase of the entire length of the zoom lens to achieve a sufficient zoom ratio, and is therefore not preferable. On the other hand, if the upper limit of the conditional expression (3) is exceeded, the power of the second lens group G2 tends to be strong. While this is advantageous in view of reduction of the entire length of the zoom lens, this makes it difficult to minimize astigmatism. Further, the length of the second lens group G2 in the optical axis direction is increased, and this tends to increase the collapsed thickness of the zoom lens and is not preferable. When the interval between the second-group fourth lens L24 and the second-group fifth lens L25 along the optical axis and the focal length of the entire zoom lens at the wide-angle end are adapted to satisfy the conditional expression (3), it is easier to achieve reduction of the entire length of the zoom lens and reduction of the collapsed thickness of the zoom lens while preferably maintaining the power of the second lens group, and it is easier to correct astigmatism. In this view, it is preferable for providing higher optical performance that the numerical range for the conditional expression (3) is as follows:

$$0.09 < D14/fw < 0.25 \qquad (3\text{-}1).$$

The conditional expression (4) defines a preferable range of the ratio of the interval D12 between the second-group third lens L23 and the second-group fourth lens L24 in the second lens group G2 along the optical axis to the focal length fw of the entire zoom lens at the wide-angle end. If the lower limit of the conditional expression (4) is not reached, the power of the second lens group G2 tends to be weak. In this case, one may consider increasing the amount of movement of the second lens group G2 during magnification change to achieve a sufficient zoom ratio. However, this results in increase of the entire length of the zoom lens to achieve a sufficient zoom ratio, and is therefore not preferable. On the other hand, if the upper limit of the conditional expression (4) is exceeded, the power of the second lens group G2 tends to be strong. While this is advantageous in view of reduction of the entire lens length, this makes it difficult to minimize astigmatism. Further, the length of the second lens group G2 in the optical axis direction is increased, and this tends to increase the collapsed thickness of the zoom lens and is not preferable. When the interval between the second-group third lens L23 and the second-group fourth lens L24 along the optical axis and the focal length of the entire zoom lens at the wide-angle end are adapted to satisfy the conditional expression (4), it is easier to achieve reduction of the entire length of the zoom lens and reduction of the collapsed thickness of the zoom lens while preferably maintaining the power of the second lens group, and it is easier to correct astigmatism. In this view, it is preferable for providing higher optical performance that the numerical range for the conditional expression (4) is as follows:

$$0.20 < D12/fw < 0.52 \qquad (4\text{-}1).$$

The conditional expression (5) defines a preferable range of the half angle of view $\omega$ at the wide-angle end. If the lower limit of the conditional expression (5) is not reached, it is difficult to perform wide-angle imaging. When the conditional expression (5) is satisfied, a zoom lens that allows wide-angle imaging can be achieved.

As described above, according to the zoom lens of this embodiment, a wide-angle zoom lens having high optical performance for achieving a small F-number and reduction of the entire length of the zoom lens can be achieved by optimizing the lens configuration of the zoom lens having a three-group configuration to satisfy the appropriate conditional expressions, as necessary. As a result, a zoom lens that can achieve an image size larger than a conventional image size relative to the entire length of the zoom lens can be provided while achieving reduction of the entire length of the zoom lens. Further, according to an imaging apparatus provided with the zoom lens according to this embodiment, the entire apparatus can be made compact while maintaining good imaging performance that allows wide-angle imaging.

Next, numerical examples of the zoom lens of the invention are described. FIGS. 1 to 10 show sectional views of zoom lenses of Examples 1 to 10, respectively.

Tables 1 to 3, which are presented below, show specific lens data corresponding to the configuration of the zoom lens shown in FIG. 1. Specifically, Table 1 shows lens data, Table 2 shows data of aspherical surfaces, and Table 3 shows data with respect to magnification change and specification data of the zoom lens of Example 1. Similarly, the lens data, the data of aspherical surfaces and the data with respect to magnification change of the zoom lenses of Examples 2 to 10 are shown in Tables 4 to 30. In the following description, meanings of symbols used in the tables are explained with respect to Example 1 as an example. Basically, the same explanations apply to those with respect to Examples 2 to 10.

In the lens data shown in Table 1, each value in the column of "Si" represents the surface number of the i-th (i=1, 2, 3, ...) surface, where the surface of the most object-side element is the 1st surface and the number is sequentially increased toward the image side, each value in the column of "Ri" represents the radius of curvature of the i-th surface, and each value in the column of "Di" represents the surface interval between the i-th surface and the i+1-th surface along the optical axis Z. It should be noted that the value at the bottom in the column of surface interval is a surface interval between the last surface shown in the table and the imaging plane. Further, in the lens data shown in Table 1, each value in the column of "Ndj" represents the refractive index with respect to the d-line (the wavelength of 587.6 nm) of the j-th (j=1, 2, 3, ...) optical element, where the most object-side lens is the 1st element and the number is sequentially increased toward the image side, and each value in the column of "vdj" represents the Abbe number with respect to the d-line of the j-th element. It should be noted that the lens data also includes data of the aperture stop St and the optical member PP. The text "(aperture stop)" is shown at the position in the column of the surface number of the surface corresponding to the aperture stop St. In the lens data, a positive radius of curvature indicates a surface that is convex toward the object side, and a negative radius of curvature indicates a surface that is convex toward the image side.

In the lens data shown in Table 1, the texts "DD[6] (variable)", "DD[16](variable)", "DD[18](variable)" and "DD[20](variable)" are shown at positions in the column of surface interval corresponding to the interval between the first lens group G1 and the second lens group G2, the interval between the second lens group G2 and the aperture stop St, the interval between the second lens group G2 and the third lens group G3, the interval between the third lens group G3 and the optical member PP, and the interval between the optical member PP and the imaging plane, which are changed during magnification change. It should be noted that, with respect to Example 3, only the "DD[6](variable)" and "DD[16](variable)" are variables.

In the lens data shown in Table 1, the symbol "*" is added to the surface number of each aspherical surface, and a numerical value of the paraxial radius of curvature of the aspherical surface is shown as the radius of curvature. The data of aspherical surfaces shown in Table 2 shows the surface number Si of each aspherical surface and aspherical coefficients of the aspherical surface. The aspherical coefficients are values of coefficients KA and Am (where m=3, 4, 5, ..., 20) in the aspherical surface equation (6) below:

$$Zd = C \cdot h^2 / \{1 + (1 - KA \cdot C^2 \cdot h^2)^{1/2}\} + \Sigma Am \cdot h^m \qquad (6)$$

where Zd is a depth of the aspherical surface (a length of a perpendicular line from a point with a height h on the aspherical surface to a plane tangent to the apex of the aspherical surface and perpendicular to the optical axis), h is the height (a distance from the optical axis to the lens surface), C is a reciprocal of the paraxial curvature, and KA and Am are aspherical coefficients (where m=3, 4, 5, ..., 20).

Table 3 shows data with respect to magnification change and specification data. The data with respect to magnification change shown in Table 3 shows values of the surface intervals DD[6], DD[16], DD[18] and DD[20] at the wide-angle end, at an intermediate position and at the telephoto end. The specification data shown in Table 3 shows values of the zoom magnification (zoom ratio), the focal length f, the backfocus Bf (equivalent air distance), the F-number Fno. and the total angle of view 2ω at the wide-angle end, at the intermediate position and at the telephoto end.

The unit of Ri and Di shown in Table 1, the unit of f, DD[6], DD[16], DD[18] and DD[20] shown in Table 3, and the unit of Zd and h in the equation (A) may be millimeters. However, since optical systems can be used with being proportionally enlarged or reduced, the unit is not limited to millimeters and any other suitable unit may be used. The unit of the total angle of view 2ω shown in Table 3 is degrees.

Table 31 shows values corresponding to the conditional expressions (1) to (5) with respect to Examples 1 to 10. As can be seen from Table 31, all of Examples 1 to 10 satisfy the conditional expressions (1) to (5).

Figure 11:
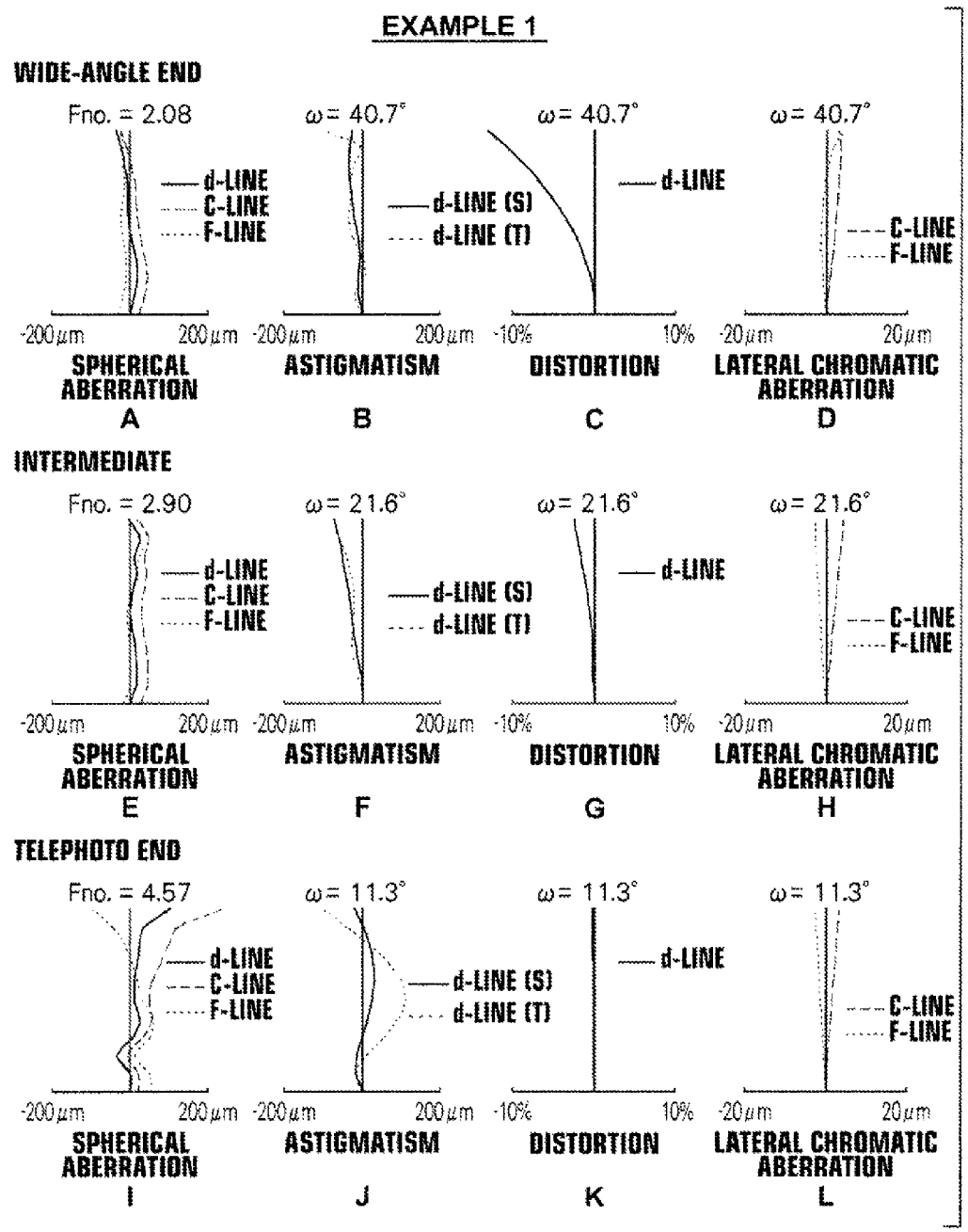
FIG. 11 shows, at "A" to "L", aberration diagrams of the zoom lens according to Example 1 of the invention.

FIG. 11 shows, at "A" to "D", aberration diagrams of spherical aberration, astigmatism, distortion and lateral aberration (lateral chromatic aberration) of the zoom lens of Example 1 at the wide-angle end. FIG. 11 also shows, at "E" to "H", aberration diagrams of spherical aberration, astigmatism, distortion and lateral aberration of the zoom lens of Example 1 at an intermediate position in the zoom range. FIG. 11 also shows, at "I" to "L", aberration diagrams of spherical aberration, astigmatism, distortion and lateral aberration of the zoom lens of Example 1 at the telephoto end.

The aberration diagrams showing spherical aberration, astigmatism and distortion show aberrations with respect to the d-line (the wavelength of 587.6 nm) being the reference wavelength. In each spherical aberration diagram, aberration with respect to the d-line is shown in the solid line, aberration with respect to the C-line (656.3 nm) is shown in the dashed line, and aberration with respect to the F-line (the wavelength of 486.1 nm) is shown in the dotted line. In each astigmatism diagram, aberration in the sagittal direction is shown in the solid line and aberration in the tangential direction is shown in the dotted line. In each lateral aberration diagram, aberration with respect to the C-line (656.3 nm) is shown in the dashed line, and aberration with respect to the F-line (the wavelength of 486.1 nm) is shown in the dotted line. The symbol "Fno." in the spherical aberration diagrams means "F-number" and the symbol "ω" in other aberration diagrams mean "half angle of view".

Figure 15:
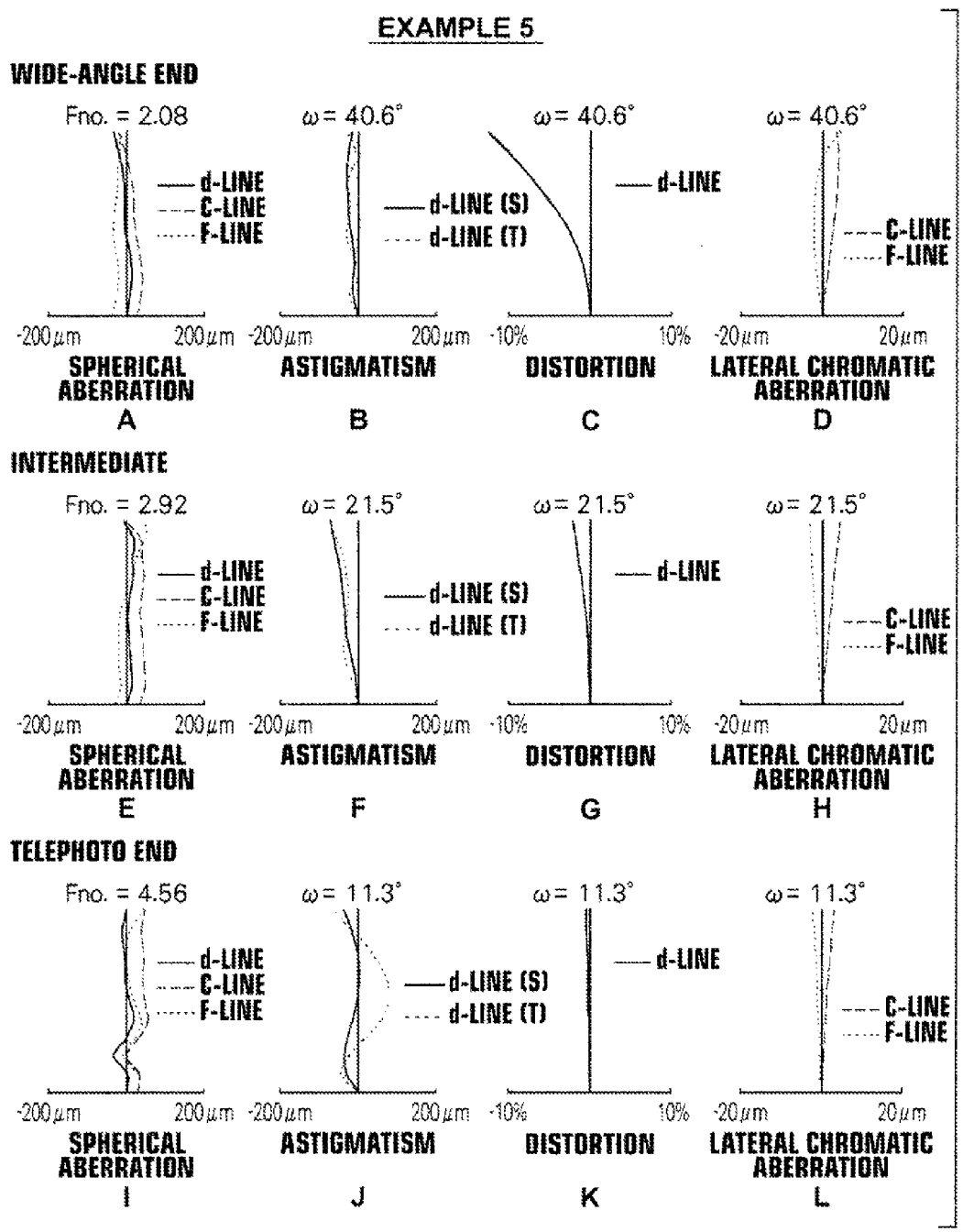
FIG. 15 shows, at "A" to "L", aberration diagrams of the zoom lens according to Example 5 of the invention.
Figure 16:
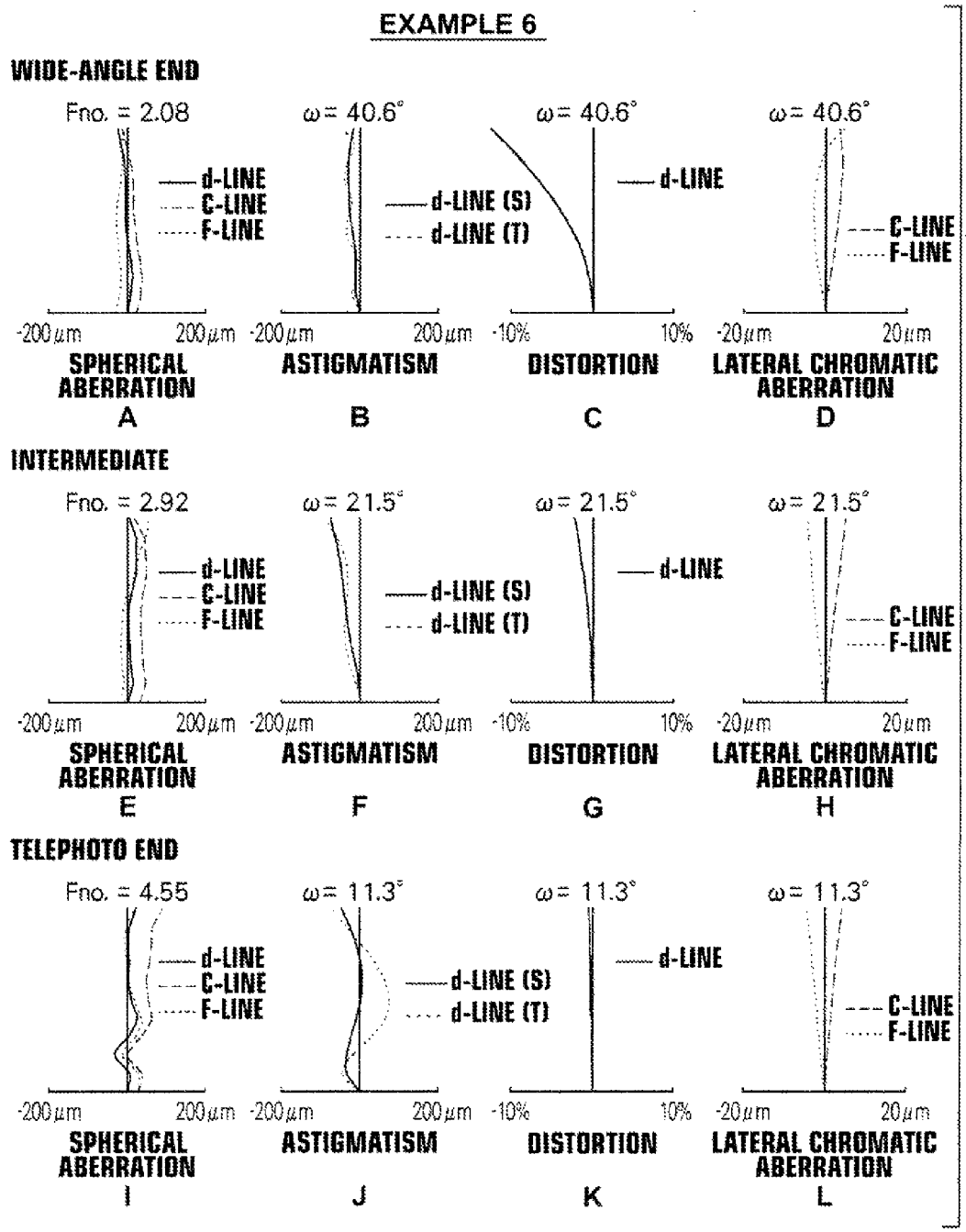
FIG. 16 shows, at "A" to "L", aberration diagrams of the zoom lens according to Example 6 of the invention.

Similarly, FIG. 12 shows, at "A" to "L", the aberrations of the zoom lens of Example 2 at the wide-angle end, at the intermediate position and at the telephoto end; FIG. 13 shows, at "A" to "L", the aberrations of the zoom lens of Example 3 at the wide-angle end, at the intermediate position and at the telephoto end; FIG. 14 shows, at "A" to "L", the aberrations of the zoom lens of Example 4 at the wide-angle end, at the intermediate position and at the telephoto end; FIG. 15 shows, at "A" to "L", the aberrations of the zoom lens of Example 5 at the wide-angle end, at the intermediate position and at the telephoto end; FIG. 16 shows, at "A" to "L", the aberrations of the zoom lens of Example 6 at the wide-angle end, at the intermediate position and at the telephoto end; FIG. 17 shows, at "A" to "L", the aberrations of the zoom lens of Example 7 at the wide-angle end, at the intermediate position and at the telephoto end; FIG. 18 shows, at "A" to "L", the aberrations of the zoom lens of Example 8 at the wide-angle end, at the intermediate position and at the telephoto end; FIG. 19 shows, at "A" to "L", the aberrations of the zoom lens of Example 9 at the wide-angle end, at the intermediate position and at the telephoto end; and FIG. 20 shows, at "A" to "L", the aberrations of the zoom lens of Example 10 at the wide-angle end, at the intermediate position and at the telephoto end.

It can be seen from the above-described data that the zoom lenses of Examples 1 to 10 are compact and have a high magnification of about 3.8×, and have high optical performance for achieving a small F-number and high image quality.

Figure 21A:
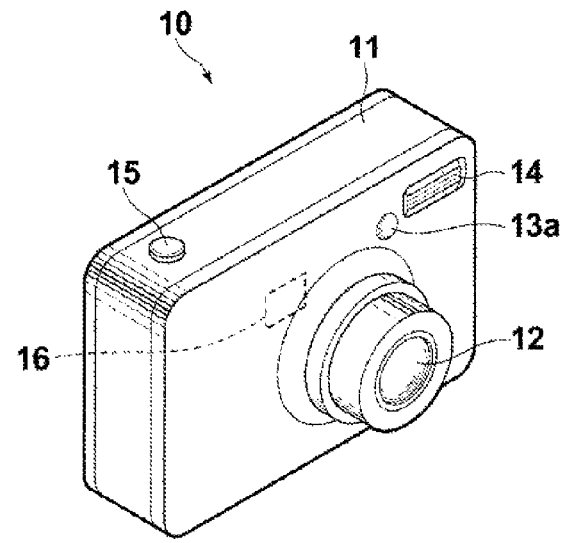
FIG. 21A is a front perspective view of an imaging apparatus according to an embodiment of the invention.
Figure 21B:
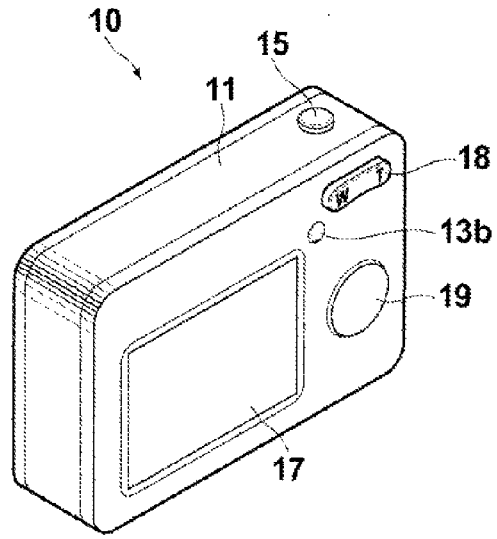
FIG. 21B is a rear perspective view of the imaging apparatus according to the embodiment of the invention.

Next, an embodiment of an imaging apparatus of the invention is described. FIGS. 21A and 21B are a front perspective view and a rear perspective view, respectively, of a digital camera 10, which is one embodiment of the imaging apparatus of the invention.

As shown in FIG. 21A, the digital camera 10 includes, at the front side of a camera body 11, a zoom lens 12 according to the embodiment of the invention, a finder objective window 13a, and a flashlight emitting unit 14 for emitting flashlight toward the subject. The digital camera 10 also includes a shutter button 15, which is disposed at the top side of the camera body 11, and an image sensor 16, such as a CCD or CMOS, which is disposed in the camera body 11, for capturing an image of the subject imaged by the zoom lens 12.

Further, as shown in FIG. 21B, a LCD (Liquid Crystal Display) 17 for displaying images and various setting screens, a finder observation window 13b, a zoom lever 18 used to change the magnification of the zoom lens 12, and an operation button 19 used to perform various settings are disposed at the rear side of the camera body 11. It should be noted that this digital camera 10 is configured such that light from the subject guided through the front-side finder objective window 13a can be viewed through the rear-side finder observation window 13b.

The zoom lens 12 is disposed such that the optical axis direction thereof coincides with the thickness direction of the camera body 11. As described above, the zoom lens 12 of this embodiment achieves sufficient reduction of the entire length of the zoom lens. Therefore, the entire length of the optical system in the optical axis direction when the zoom lens 12 is collapsed or retracted into the camera body 11 is reduced, thereby allowing reduction of the thickness of the digital camera 10. Further, since the zoom lens 12 of this embodiment is a wide angle zoom lens and has high optical performance, the digital camera 10 can perform imaging with a wide angle of view and obtain good images.

The present invention has been described with reference to the embodiments and examples. However, the invention is not limited to the above-described embodiments and examples, and various modifications may be made to the invention. For example, the values of the radius of curvature, the surface interval, the refractive index, the Abbe number, etc., of each lens component are not limited to the values shown in the above-described numerical examples and may take different values.

Further, in the zoom lens of the invention, lens groups that are moved during magnification change and directions of the movement thereof are not limited to those of the above-described example.

Although the above-described embodiment is explained in relation to a digital camera as an example of the imaging apparatus, this is not intended to limit the invention. The present invention is also applicable to other imaging apparatuses, such as a video camera, a monitoring camera, etc.

TABLE 1

Example 1: Basic Lens Data

| Si | Ri | Di | Ndj | vdj |
|---|---|---|---|---|
| 1 | 49.9991 | 0.90 | 1.882997 | 40.76 |
| 2 | 10.0000 | 2.80 | | |
| 3 | 41.9690 | 0.75 | 1.882997 | 40.76 |
| 4 | 18.6760 | 2.94 | | |
| *5 | 33.1456 | 2.30 | 1.999000 | 20.48 |
| *6 | 500.0877 | DD[6] (variable) | | |
| 7 (aperture stop) | ∞ | 0.80 | | |
| *8 | 10.0000 | 2.80 | 1.693500 | 53.20 |
| *9 | 33.1777 | 0.10 | | |
| 10 | 8.8000 | 3.51 | 1.496999 | 81.54 |
| 11 | 69.8497 | 0.80 | 1.761821 | 26.52 |
| 12 | 7.5001 | 2.50 | | |
| *13 | 10.1438 | 1.93 | 1.803480 | 40.44 |
| *14 | −89.3739 | 0.68 | | |
| 15 | −19.9999 | 1.00 | 1.666800 | 33.05 |
| 16 | 19.9999 | DD[16] (variable) | | |
| 17 | 21.4046 | 2.80 | 1.496999 | 81.54 |
| 18 | −40.3769 | DD[18] (variable) | | |
| 19 | ∞ | 0.80 | 1.516798 | 64.20 |
| 20 | ∞ | DD[20] (variable) | | |

*aspherical surface

TABLE 2

Example 1: Data of Aspherical Surfaces

| Surface No. | KA | A3 | A4 | A5 | A6 |
|---|---|---|---|---|---|
| 5 | 0.000000E+00 | −5.163491E−05 | 4.026671E−04 | −5.926771E−04 | 3.980217E−04 |
| 6 | 0.000000E+00 | 8.880604E−05 | −1.515301E−04 | 1.360043E−05 | 2.382303E−05 |
| 8 | 0.000000E+00 | 2.249686E−05 | 1.334507E−05 | 5.637807E−05 | −1.089294E−05 |
| 9 | 0.000000E+00 | 4.700616E−06 | −2.389262E−05 | 2.194508E−05 | −1.627366E−06 |
| 13 | 0.000000E+00 | −5.347401E−04 | 7.066569E−04 | −3.190578E−04 | 5.832550E−05 |
| 14 | 0.000000E+00 | −7.325352E−04 | 1.439323E−03 | −8.224069E−04 | 3.266632E−04 |

| | A7 | A8 | A9 | A10 | A11 |
|---|---|---|---|---|---|
| 5 | −1.467574E−04 | 3.086196E−05 | −3.106347E−06 | −4.352957E−08 | 3.178219E−08 |
| 6 | −1.219138E−05 | 2.724143E−06 | −3.082541E−07 | 5.063592E−09 | 3.460452E−09 |
| 8 | −9.633368E−08 | 1.483604E−07 | 2.167282E−08 | −4.424437E−09 | 0.000000E+00 |
| 9 | −1.223627E−06 | 4.191255E−08 | 5.991994E−08 | −7.558685E−09 | 0.000000E+00 |
| 13 | 1.798156E−05 | −8.731877E−06 | 1.576472E−06 | −5.873112E−07 | 6.926246E−08 |
| 14 | −5.456224E−05 | −3.978280E−06 | 4.647479E−06 | −1.497945E−06 | 2.367317E−07 |

| | A12 | A13 | A14 | A15 | A16 |
|---|---|---|---|---|---|
| 5 | 1.421154E−09 | −4.114571E−10 | −8.615419E−11 | 1.487922E−11 | 9.066599E−13 |
| 6 | −9.552202E−11 | −6.298783E−11 | −2.950623E−12 | 1.711729E−12 | 1.778010E−14 |
| 8 | 0.000000E+00 | 0.000000E+00 | 0.000000E+00 | 0.000000E+00 | 0.000000E+00 |

TABLE 2-continued

Example 1: Data of Aspherical Surfaces

|    |               |               |                |                |                |
|----|---------------|---------------|----------------|----------------|----------------|
| 9  | 0.000000E+00  | 0.000000E+00  | 0.000000E+00   | 0.000000E+00   | 0.000000E+00   |
| 13 | −3.840837E−09 | 1.943851E−08  | −3.955114E−09  | 6.605872E−10   | −7.812392E−10  |
| 14 | −3.697367E−08 | 1.016211E−08  | −3.241904E−09  | 1.540696E−09   | 8.727365E−11   |

|    | A17           | A18           | A19            | A20            |
|----|---------------|---------------|----------------|----------------|
| 5  | −2.842210E−13 | 1.501067E−14  | 5.991533E−17   | −1.369826E−17  |
| 6  | −2.508988E−14 | 1.691468E−15  | −4.495487E−17  | 1.351970E−18   |
| 8  | 0.000000E+00  | 0.000000E+00  | 0.000000E+00   | 0.000000E+00   |
| 9  | 0.000000E+00  | 0.000000E+00  | 0.000000E+00   | 0.000000E+00   |
| 13 | 1.050550E−10  | 5.662914E−11  | −1.555974E−11  | 1.051132E−12   |
| 14 | −1.404961E−10 | −4.414693E−11 | 2.523396E−11   | −2.703669E−12  |

TABLE 3

|                  | DD[6] | DD[16] | DD[18] | DD[20] |
|------------------|-------|--------|--------|--------|
| Wide-angle end   | 22.92 | 6.31   | 2.40   | 0.99   |
| Intermediate     | 8.59  | 14.29  | 2.39   | 0.99   |
| Telephoto end    | 1.16  | 29.74  | 2.54   | 0.94   |

|                  | Zoom magnification | f     | Bf   | FNo. | 2ω[°]  |
|------------------|--------------------|-------|------|------|--------|
| Wide-angle end   | 1.0                | 7.35  | 3.92 | 2.08 | 81.45  |
| Intermediate     | 1.9                | 14.26 | 3.91 | 2.90 | 43.16  |
| Telephoto end    | 3.8                | 27.69 | 4.01 | 4.57 | 22.51  |

TABLE 4

Example 2: Basic Lens Data

| Si            | Ri        | Di              | Ndj      | vdj   |
|---------------|-----------|-----------------|----------|-------|
| 1             | 49.9991   | 0.90            | 1.882997 | 40.76 |
| 2             | 10.0000   | 2.80            |          |       |
| 3             | 41.1057   | 0.75            | 1.882997 | 40.76 |
| 4             | 21.0061   | 2.90            |          |       |
| *5            | 35.1061   | 2.30            | 1.999000 | 20.48 |
| *6            | 500.0877  | DD[6] (variable)|          |       |
| 7 (aperture stop) | ∞     | 0.80            |          |       |
| *8            | 10.0000   | 2.80            | 1.693500 | 53.20 |
| *9            | 28.5481   | 0.10            |          |       |
| 10            | 8.8602    | 3.49            | 1.496999 | 81.54 |
| 11            | 61.3282   | 0.80            | 1.761821 | 26.52 |
| 12            | 7.5001    | 2.50            |          |       |
| *13           | 10.0000   | 2.10            | 1.803480 | 40.44 |
| *14           | −51.0699  | 1.00            |          |       |
| 15            | −21.8418  | 2.10            | 1.666800 | 33.05 |
| 16            | 14.0126   | DD[16] (variable)|         |       |
| 17            | 22.6579   | 3.00            | 1.496999 | 81.54 |
| 18            | −29.0103  | DD[18] (variable)|         |       |
| 19            | ∞         | 0.80            | 1.516798 | 64.20 |
| 20            | ∞         | DD[20] (variable)|         |       |

*aspherical surface

TABLE 5

Example 2: Data of Aspherical Surfaces

| Surface No. | KA           | A3            | A4            | A5            | A6            |
|-------------|--------------|---------------|---------------|---------------|---------------|
| 5           | 0.000000E+00 | −4.771373E−05 | 3.953344E−04  | −5.934033E−04 | 3.980552E−04  |
| 6           | 0.000000E+00 | 1.032641E−04  | −1.640466E−04 | 1.452956E−05  | 2.370796E−05  |
| 8           | 0.000000E+00 | 3.294413E−05  | 5.977955E−06  | 5.428228E−05  | −1.091795E−05 |
| 9           | 0.000000E+00 | 2.218157E−05  | −2.967680E−05 | 2.065743E−05  | −1.790680E−06 |
| 13          | 0.000000E+00 | −5.541142E−04 | 6.719499E−04  | −3.210310E−04 | 5.663264E−05  |
| 14          | 0.000000E+00 | −8.002759E−04 | 1.412713E−03  | −8.368308E−04 | 3.244942E−04  |

|    | A7            | A8            | A9            | A10           | A11           |
|----|---------------|---------------|---------------|---------------|---------------|
| 5  | −1.467712E−04 | 3.085921E−05  | −3.106323E−06 | −4.349426E−08 | 3.178849E−08  |
| 6  | −1.221002E−05 | 2.723156E−06  | −3.082047E−07 | 5.064149E−09  | 3.461935E−09  |
| 8  | −6.890857E−08 | 1.485898E−07  | 2.073642E−08  | −4.632057E−09 | 0.000000E+00  |
| 9  | −1.221341E−06 | 4.454892E−08  | 5.983438E−08  | −7.987207E−09 | 0.000000E+00  |
| 13 | 1.792719E−05  | −8.656577E−06 | 1.575307E−06  | −5.824988E−07 | 7.019226E−08  |
| 14 | −5.442808E−05 | −3.713433E−06 | 4.572299E−06  | −1.486348E−06 | 2.365432E−07  |

|    | A12           | A13           | A14           | A15           | A16           |
|----|---------------|---------------|---------------|---------------|---------------|
| 5  | 1.421529E−09  | −4.114985E−10 | −8.617054E−11 | 1.487690E−11  | 9.063603E−13  |
| 6  | −9.501727E−11 | −6.293120E−11 | −2.952062E−12 | 1.711382E−12  | 1.757414E−14  |
| 8  | 0.000000E+00  | 0.000000E+00  | 0.000000E+00  | 0.000000E+00  | 0.000000E+00  |
| 9  | 0.000000E+00  | 0.000000E+00  | 0.000000E+00  | 0.000000E+00  | 0.000000E+00  |
| 13 | −3.691880E−09 | 1.946001E−08  | −3.955812E−09 | 6.542847E−10  | −7.814079E−10 |
| 14 | −3.661876E−08 | 1.025017E−08  | −3.197869E−09 | 1.516969E−09  | 8.848572E−11  |

|    | A17           | A18           | A19            | A20            |
|----|---------------|---------------|----------------|----------------|
| 5  | −2.842123E−13 | 1.501486E−14  | 6.059754E−17   | −1.375132E−17  |
| 6  | −2.514480E−14 | 1.682783E−15  | −4.533559E−17  | 1.593833E−18   |

TABLE 5-continued

Example 2: Data of Aspherical Surfaces

| | | | | |
|---|---|---|---|---|
| 8 | 0.000000E+00 | 0.000000E+00 | 0.000000E+00 | 0.000000E+00 |
| 9 | 0.000000E+00 | 0.000000E+00 | 0.000000E+00 | 0.000000E+00 |
| 13 | 1.050404E−10 | 5.665532E−11 | −1.555083E−11 | 1.052161E−12 |
| 14 | −1.404703E−10 | −4.413286E−11 | 2.524433E−11 | −2.703600E−12 |

TABLE 6

| | DD[6] | DD[16] | DD[18] | DD[20] |
|---|---|---|---|---|
| Wide-angle end | 23.11 | 4.13 | 2.64 | 1.00 |
| Intermediate | 8.72 | 11.85 | 2.42 | 1.01 |
| Telephoto end | 1.03 | 26.30 | 2.64 | 1.11 |

| | Zoom magnification | f | Bf | FNo. | 2ω[°] |
|---|---|---|---|---|---|
| Wide-angle end | 1.0 | 7.35 | 4.17 | 2.08 | 81.26 |
| Intermediate | 1.9 | 14.27 | 3.96 | 2.92 | 43.08 |
| Telephoto end | 3.8 | 27.70 | 4.28 | 4.56 | 22.60 |

TABLE 7

Example 3: Basic Lens Data

| Si | Ri | Di | Ndj | vdj |
|---|---|---|---|---|
| 1 | 49.9991 | 0.90 | 1.882997 | 40.76 |
| 2 | 10.0000 | 2.80 | | |
| 3 | 45.9124 | 0.75 | 1.882997 | 40.76 |
| 4 | 24.7190 | 2.90 | | |
| *5 | 37.2777 | 2.30 | 1.999000 | 20.48 |
| *6 | 500.0900 | DD[6] (variable) | | |
| 7 (aperture stop) | ∞ | 0.80 | | |
| *8 | 10.0000 | 3.22 | 1.693500 | 53.20 |
| *9 | 27.4908 | 0.10 | | |
| 10 | 8.8000 | 3.51 | 1.496999 | 81.54 |
| 11 | 164.9650 | 0.80 | 1.755199 | 27.51 |
| 12 | 7.5001 | 2.50 | | |
| *13 | 10.5095 | 2.10 | 1.803480 | 40.44 |
| *14 | −25.1298 | 1.00 | | |
| 15 | −15.1462 | 2.10 | 1.639799 | 34.46 |
| 16 | 13.0086 | DD[16] (variable) | | |
| 17 | 19.3591 | 3.00 | 1.496999 | 81.54 |
| 18 | −30.9697 | 2.36 | | |
| 19 | ∞ | 0.80 | 1.516798 | 64.20 |
| 20 | ∞ | 1.01 | | |

*aspherical surface

TABLE 8

Example 3: Data of Aspherical Surfaces

| Surface No. | KA | A3 | A4 | A5 | A6 |
|---|---|---|---|---|---|
| 5 | 0.000000E+00 | −1.223911E−04 | 4.509993E−04 | −5.995593E−04 | 3.953330E−04 |
| 6 | 0.000000E+00 | 2.968518E−05 | −9.664813E−05 | −3.206975E−06 | 2.607485E−05 |
| 8 | 0.000000E+00 | 1.200120E−05 | 1.916518E−05 | 4.971362E−05 | −9.575462E−06 |
| 9 | 0.000000E+00 | 9.959434E−05 | −1.116779E−04 | 5.944375E−05 | −9.816093E−06 |
| 13 | 0.000000E+00 | 3.245928E−04 | −3.742852E−04 | 7.909405E−05 | −1.645381E−05 |
| 14 | 0.000000E+00 | 1.187693E−04 | 2.243898E−04 | −3.658181E−04 | 2.184660E−04 |

| | A7 | A8 | A9 | A10 | A11 |
|---|---|---|---|---|---|
| 5 | −1.460335E−04 | 3.085012E−05 | −3.114182E−06 | −4.395715E−08 | 3.183100E−08 |
| 6 | −1.243751E−05 | 2.738248E−06 | −3.033112E−07 | 4.672678E−09 | 3.362383E−09 |
| 8 | −6.220404E−07 | 1.938235E−07 | 3.919707E−08 | −7.230664E−09 | 0.000000E+00 |
| 9 | −1.299571E−06 | 1.652425E−07 | 8.663900E−08 | −1.341049E−08 | 0.000000E+00 |
| 13 | 1.360647E−05 | −8.927320E−06 | 1.873810E−06 | −3.372956E−07 | 2.935967E−08 |
| 14 | −5.605468E−05 | 1.308764E−06 | 2.106427E−06 | −8.290581E−07 | 1.855151E−07 |

| | A12 | A13 | A14 | A15 | A16 |
|---|---|---|---|---|---|
| 5 | 1.433656E−09 | −4.102483E−10 | −8.623934E−11 | 1.486088E−11 | 9.033544E−13 |
| 6 | −1.037956E−10 | −6.224986E−11 | −2.815452E−12 | 1.767014E−12 | 1.917512E−14 |
| 8 | 0.000000E+00 | 0.000000E+00 | 0.000000E+00 | 0.000000E+00 | 0.000000E+00 |
| 9 | 0.000000E+00 | 0.000000E+00 | 0.000000E+00 | 0.000000E+00 | 0.000000E+00 |
| 13 | −1.741989E−08 | 2.098660E−08 | −2.909052E−09 | 3.653544E−10 | −8.458360E−10 |
| 14 | −3.415128E−08 | 1.046371E−08 | −2.215007E−09 | 6.991128E−10 | 8.019838E−11 |

| | A17 | A18 | A19 | A20 |
|---|---|---|---|---|
| 5 | −2.841613E−13 | 1.502097E−14 | 6.896173E−17 | −1.434721E−17 |
| 6 | −2.526847E−14 | 1.495019E−15 | −5.812704E−17 | 4.531838E−18 |
| 8 | 0.000000E+00 | 0.000000E+00 | 0.000000E+00 | 0.000000E+00 |
| 9 | 0.000000E+00 | 0.000000E+00 | 0.000000E+00 | 0.000000E+00 |
| 13 | 1.222701E−10 | 5.932852E−11 | −1.537275E−11 | 8.793825E−13 |
| 14 | −1.169960E−10 | −3.873480E−11 | 2.592468E−11 | −3.093351E−12 |

TABLE 9

|  | DD[6] | DD[16] |
|---|---|---|
| Wide-angle end | 24.02 | 4.05 |
| Intermediate | 8.92 | 11.42 |
| Telephoto end | 1.14 | 25.74 |

|  | Zoom magnification | f | Bf | FNo. | 2ω[°] |
|---|---|---|---|---|---|
| Wide-angle end | 1.0 | 7.35 | 3.90 | 2.08 | 81.17 |
| Intermediate | 1.9 | 14.26 | 3.90 | 2.90 | 43.05 |
| Telephoto end | 3.8 | 27.70 | 3.90 | 4.58 | 22.53 |

TABLE 10

Example 4: Basic Lens Data

| Si | Ri | Di | Ndj | vdj |
|---|---|---|---|---|
| 1 | 49.9991 | 0.90 | 1.882997 | 40.76 |
| 2 | 10.0000 | 2.80 |  |  |
| 3 | 43.3929 | 0.75 | 1.882997 | 40.76 |
| 4 | 20.4224 | 2.90 |  |  |
| *5 | 34.3376 | 2.30 | 1.999000 | 20.48 |
| *6 | 500.0900 | DD[6] (variable) |  |  |
| 7 (aperture stop) | ∞ | 0.80 |  |  |
| *8 | 10.1569 | 3.27 | 1.693500 | 53.20 |
| *9 | 34.4780 | 0.10 |  |  |
| 10 | 8.9142 | 3.51 | 1.496999 | 81.54 |
| 11 | 437.7555 | 0.80 | 1.755199 | 27.51 |
| 12 | 7.5001 | 2.50 |  |  |
| *13 | 11.6373 | 2.10 | 1.803480 | 40.44 |
| *14 | −27.7758 | 1.00 |  |  |
| 15 | −12.5000 | 2.10 | 1.639799 | 34.46 |
| 16 | 25.4281 | DD[16] (variable) |  |  |
| 17 | 19.0204 | 3.00 | 1.496999 | 81.54 |
| 18 | −42.9680 | DD[18] (variable) |  |  |
| 19 | ∞ | 0.80 | 1.516798 | 64.20 |
| 20 | ∞ | DD[20] (variable) |  |  |

*aspherical surface

TABLE 11

Example 4: Data of Aspherical Surfaces

| Surface No. | KA | A3 | A4 | A5 | A6 |
|---|---|---|---|---|---|
| 5 | 0.000000E+00 | −6.769773E−05 | 4.221945E−04 | −5.948532E−04 | 3.980316E−04 |
| 6 | 0.000000E+00 | 8.568059E−05 | −1.367565E−04 | 1.187313E−05 | 2.386217E−05 |
| 8 | 0.000000E+00 | 7.860988E−06 | 2.287645E−05 | 5.084931E−05 | −1.162954E−05 |
| 9 | 0.000000E+00 | −1.179536E−05 | 1.052369E−05 | 1.610352E−05 | −2.851143E−06 |
| 13 | 0.000000E+00 | −4.723032E−04 | 6.841227E−04 | −2.969060E−04 | 5.337929E−05 |
| 14 | 0.000000E+00 | −6.737036E−04 | 1.325107E−03 | −8.140434E−04 | 3.361891E−04 |

|  | A7 | A8 | A9 | A10 | A11 |
|---|---|---|---|---|---|
| 5 | −1.467036E−04 | 3.086195E−05 | −3.106557E−06 | −4.353447E−08 | 3.179244E−08 |
| 6 | −1.217161E−05 | 2.732095E−06 | −3.081943E−07 | 4.987234E−09 | 3.444731E−09 |
| 8 | −6.179123E−08 | 1.711820E−07 | 2.451230E−08 | −5.586473E−09 | 0.000000E+00 |
| 9 | −1.243455E−06 | 8.070991E−08 | 6.711727E−08 | −9.796315E−09 | 0.000000E+00 |
| 13 | 1.848706E−05 | −8.530612E−06 | 1.654082E−06 | −5.984603E−07 | 6.779229E−08 |
| 14 | −5.851752E−05 | −3.918304E−06 | 4.572378E−06 | −1.297612E−06 | 2.099242E−07 |

|  | A12 | A13 | A14 | A15 | A16 |
|---|---|---|---|---|---|
| 5 | 1.421272E−09 | −4.114709E−10 | −8.618474E−11 | 1.487502E−11 | 9.061404E−13 |
| 6 | −9.628176E−11 | −6.298636E−11 | −2.897558E−12 | 1.715083E−12 | 1.829666E−14 |
| 8 | 0.000000E+00 | 0.000000E+00 | 0.000000E+00 | 0.000000E+00 | 0.000000E+00 |
| 9 | 0.000000E+00 | 0.000000E+00 | 0.000000E+00 | 0.000000E+00 | 0.000000E+00 |
| 13 | −3.229627E−09 | 1.942134E−08 | −3.939482E−09 | 6.906788E−10 | −7.856064E−10 |
| 14 | −4.034372E−08 | 1.113093E−08 | −3.089229E−09 | 1.334705E−09 | 1.054944E−10 |

|  | A17 | A18 | A19 | A20 |
|---|---|---|---|---|
| 5 | −2.841526E−13 | 1.502101E−14 | 6.222625E−17 | −1.397337E−17 |
| 6 | −2.520493E−14 | 1.666980E−15 | −4.679850E−17 | 1.954902E−18 |
| 8 | 0.000000E+00 | 0.000000E+00 | 0.000000E+00 | 0.000000E+00 |
| 9 | 0.000000E+00 | 0.000000E+00 | 0.000000E+00 | 0.000000E+00 |
| 13 | 1.045905E−10 | 5.659607E−11 | −1.554898E−11 | 1.051139E−12 |
| 14 | −1.333482E−10 | −4.395801E−11 | 2.532292E−11 | −2.779705E−12 |

TABLE 12

|  | DD[6] | DD[16] | DD[18] | DD[20] |
|---|---|---|---|---|
| Wide-angle end | 22.52 | 4.09 | 2.78 | 1.00 |
| Intermediate | 8.63 | 12.38 | 2.38 | 1.00 |
| Telephoto end | 1.08 | 27.50 | 2.68 | 0.99 |

|  | Zoom magnification | f | Bf | FNo. | 2ω[°] |
|---|---|---|---|---|---|
| Wide-angle end | 1.0 | 7.35 | 4.31 | 2.08 | 81.31 |
| Intermediate | 1.9 | 14.26 | 3.91 | 2.93 | 43.18 |
| Telephoto end | 3.8 | 27.69 | 4.20 | 4.56 | 22.50 |

TABLE 13

Example 5: Basic Lens Data

| Si | Ri | Di | Ndj | νdj |
|---|---|---|---|---|
| 1 | 49.9991 | 0.90 | 1.882997 | 40.76 |
| 2 | 10.0000 | 2.80 | | |
| 3 | 50.2262 | 0.75 | 1.882997 | 40.76 |
| 4 | 25.6843 | 2.90 | | |
| *5 | 36.9622 | 2.30 | 1.999000 | 20.48 |
| *6 | 500.0900 | DD[6] (variable) | | |
| 7 (aperture stop) | ∞ | 0.80 | | |
| *8 | 10.0442 | 2.81 | 1.693500 | 53.20 |
| *9 | 33.2622 | 0.10 | | |
| 10 | 9.2311 | 3.51 | 1.496999 | 81.54 |
| 11 | 5511.6068 | 0.80 | 1.755199 | 27.51 |
| 12 | 7.5001 | 2.50 | | |
| *13 | 11.4922 | 2.10 | 1.803480 | 40.44 |
| *14 | −28.2018 | 1.77 | | |
| 15 | −13.7091 | 2.10 | 1.639799 | 34.46 |
| 16 | 17.4215 | DD[16] (variable) | | |
| 17 | 19.4416 | 3.00 | 1.496999 | 81.54 |
| 18 | −30.8566 | DD[18] (variable) | | |
| 19 | ∞ | 0.80 | 1.516798 | 64.20 |
| 20 | ∞ | DD[20] (variable) | | |

*aspherical surface

TABLE 14

Example 5: Data of Aspherical Surfaces

| Surface No. | KA | A3 | A4 | A5 | A6 |
|---|---|---|---|---|---|
| 5 | 0.000000E+00 | −7.729126E−05 | 4.238795E−04 | −5.964529E−04 | 3.978697E−04 |
| 6 | 0.000000E+00 | 7.907085E−05 | −1.349976E−04 | 1.120957E−05 | 2.370896E−05 |
| 8 | 0.000000E+00 | 1.485274E−05 | 4.236173E−05 | 5.125213E−05 | −1.157940E−05 |
| 9 | 0.000000E+00 | 3.244988E−05 | 3.695009E−05 | 2.093410E−05 | −2.652848E−06 |
| 13 | 0.000000E+00 | −3.649050E−04 | 7.388665E−04 | −2.783499E−04 | 5.631581E−05 |
| 14 | 0.000000E+00 | −6.072183E−04 | 1.394629E−03 | −7.986422E−04 | 3.391844E−04 |

|  | A7 | A8 | A9 | A10 | A11 |
|---|---|---|---|---|---|
| 5 | −1.467010E−04 | 3.086106E−05 | −3.106645E−06 | −4.354932E−08 | 3.179348E−08 |
| 6 | −1.219103E−05 | 2.732019E−06 | −3.081120E−07 | 4.986692E−09 | 3.442508E−09 |
| 8 | −3.383682E−08 | 1.760367E−07 | 2.447133E−08 | −5.920276E−09 | 0.000000E+00 |
| 9 | −1.266461E−06 | 7.735228E−08 | 6.682545E−08 | −9.947010E−09 | 0.000000E+00 |
| 13 | 1.888330E−05 | −8.431566E−06 | 1.664221E−06 | −5.883282E−07 | 6.939417E−08 |
| 14 | −5.838409E−05 | −3.842852E−06 | 4.705422E−06 | −1.299430E−06 | 2.105373E−07 |

|  | A12 | A13 | A14 | A15 | A16 |
|---|---|---|---|---|---|
| 5 | 1.421201E−09 | −4.114629E−10 | −8.619152E−11 | 1.487478E−11 | 9.060081E−13 |
| 6 | −9.662667E−11 | −6.302682E−11 | −2.896353E−12 | 1.715223E−12 | 1.834079E−14 |
| 8 | 0.000000E+00 | 0.000000E+00 | 0.000000E+00 | 0.000000E+00 | 0.000000E+00 |
| 9 | 0.000000E+00 | 0.000000E+00 | 0.000000E+00 | 0.000000E+00 | 0.000000E+00 |
| 13 | −3.140228E−09 | 1.944557E−08 | −3.938477E−09 | 6.884232E−10 | −7.866847E−10 |
| 14 | −4.076672E−08 | 1.112690E−08 | −3.124790E−09 | 1.346040E−09 | 1.064546E−10 |

|  | A17 | A18 | A19 | A20 |
|---|---|---|---|---|
| 5 | −2.841455E−13 | 1.502011E−14 | 6.258997E−17 | −1.401414E−17 |
| 6 | −2.520910E−14 | 1.664660E−15 | −4.726725E−17 | 1.957331E−18 |
| 8 | 0.000000E+00 | 0.000000E+00 | 0.000000E+00 | 0.000000E+00 |
| 9 | 0.000000E+00 | 0.000000E+00 | 0.000000E+00 | 0.000000E+00 |
| 13 | 1.044533E−10 | 5.659620E−11 | −1.553800E−11 | 1.058243E−12 |
| 14 | −1.328948E−10 | −4.399664E−11 | 2.534565E−11 | −2.785081E−12 |

TABLE 15

|  | DD[6] | DD[16] | DD[18] | DD[20] |
|---|---|---|---|---|
| Wide-angle end | 23.53 | 3.14 | 2.41 | 1.01 |
| Intermediate | 8.76 | 10.39 | 2.39 | 1.02 |
| Telephoto end | 0.92 | 24.39 | 2.72 | 1.23 |

|  | Zoom magnification | f | Bf | FNo. | 2ω[°] |
|---|---|---|---|---|---|
| Wide-angle end | 1.0 | 7.35 | 3.95 | 2.08 | 81.11 |
| Intermediate | 1.9 | 14.27 | 3.94 | 2.92 | 43.02 |
| Telephoto end | 3.8 | 27.71 | 4.48 | 4.56 | 22.57 |

TABLE 16

Example 6: Basic Lens Data

| Si | Ri | Di | Ndj | νdj |
|---|---|---|---|---|
| 1 | 49.9991 | 0.90 | 1.882997 | 40.76 |
| 2 | 10.0000 | 2.80 |  |  |
| 3 | 50.4346 | 0.75 | 1.882997 | 40.76 |
| 4 | 24.6885 | 2.90 |  |  |
| *5 | 35.9331 | 2.30 | 1.999000 | 20.48 |
| *6 | 500.0900 | DD[6] (variable) |  |  |
| 7 (aperture stop) | ∞ | 0.80 |  |  |
| *8 | 10.0000 | 2.82 | 1.693500 | 53.20 |
| *9 | 49.0177 | 0.10 |  |  |
| 10 | 9.8571 | 2.99 | 1.496999 | 81.54 |
| 11 | −303.1914 | 0.80 | 1.755199 | 27.51 |
| 12 | 8.2259 | 3.81 |  |  |
| *13 | 12.3559 | 2.10 | 1.803480 | 40.44 |
| *14 | −27.5266 | 1.58 |  |  |
| 15 | −12.5000 | 2.10 | 1.639799 | 34.46 |
| 16 | 16.0385 | DD[16] (variable) |  |  |
| 17 | 17.7762 | 2.80 | 1.496999 | 81.54 |
| 18 | −33.6765 | DD[18] (variable) |  |  |
| 19 | ∞ | 0.80 | 1.516798 | 64.20 |
| 20 | ∞ | DD[20] (variable) |  |  |

*aspherical surface

TABLE 17

Example 6: Data of Aspherical Surfaces

| Surface No. | KA | A3 | A4 | A5 | A6 |
|---|---|---|---|---|---|
| 5 | 0.000000E+00 | −8.902583E−05 | 4.386925E−04 | −5.984788E−04 | 3.981530E−04 |
| 6 | 0.000000E+00 | 7.504275E−05 | −1.259508E−04 | 1.138205E−05 | 2.341926E−05 |
| 8 | 0.000000E+00 | 9.812187E−06 | 4.376042E−05 | 4.986321E−05 | −1.145863E−05 |
| 9 | 0.000000E+00 | 2.130276E−05 | 2.948894E−05 | 2.065644E−05 | −2.785293E−06 |
| 13 | 0.000000E+00 | −3.637345E−04 | 5.863729E−04 | −2.885861E−04 | 5.820874E−05 |
| 14 | 0.000000E+00 | −6.128726E−04 | 1.220690E−03 | −8.110108E−04 | 3.396008E−04 |

|  | A7 | A8 | A9 | A10 | A11 |
|---|---|---|---|---|---|
| 5 | −1.467236E−04 | 3.086211E−05 | −3.106085E−06 | −4.352094E−08 | 3.179322E−08 |
| 6 | −1.215007E−05 | 2.735356E−06 | −3.081325E−07 | 4.945649E−09 | 3.446935E−09 |
| 8 | 2.986808E−08 | 1.751130E−07 | 2.311265E−08 | −5.188526E−09 | 0.000000E+00 |
| 9 | −1.247753E−06 | 1.024549E−07 | 7.042325E−08 | −9.943426E−09 | 0.000000E+00 |
| 13 | 1.727881E−05 | −9.055822E−06 | 1.778641E−06 | −5.763899E−07 | 6.472952E−08 |
| 14 | −5.932846E−05 | −5.185373E−06 | 5.091954E−06 | −1.355917E−06 | 2.163193E−07 |

|  | A12 | A13 | A14 | A15 | A16 |
|---|---|---|---|---|---|
| 5 | 1.420566E−09 | −4.115741E−10 | −8.620018E−11 | 1.487488E−11 | 9.060872E−13 |
| 6 | −9.650122E−11 | −6.300002E−11 | −2.905427E−12 | 1.712254E−12 | 1.798019E−14 |
| 8 | 0.000000E+00 | 0.000000E+00 | 0.000000E+00 | 0.000000E+00 | 0.000000E+00 |
| 9 | 0.000000E+00 | 0.000000E+00 | 0.000000E+00 | 0.000000E+00 | 0.000000E+00 |
| 13 | −3.790325E−09 | 1.950174E−08 | −3.905273E−09 | 6.854280E−10 | −7.854908E−10 |
| 14 | −4.234451E−08 | 1.078330E−08 | −3.268591E−09 | 1.450185E−09 | 1.270630E−10 |

|  | A17 | A18 | A19 | A20 |
|---|---|---|---|---|
| 5 | −2.841168E−13 | 1.502035E−14 | 6.261148E−17 | −1.402209E−17 |
| 6 | −2.516737E−14 | 1.670760E−15 | −4.598719E−17 | 1.816725E−18 |
| 8 | 0.000000E+00 | 0.000000E+00 | 0.000000E+00 | 0.000000E+00 |
| 9 | 0.000000E+00 | 0.000000E+00 | 0.000000E+00 | 0.000000E+00 |
| 13 | 1.043832E−10 | 5.646357E−11 | −1.554639E−11 | 1.062090E−12 |
| 14 | −1.384768E−10 | −4.510287E−11 | 2.514022E−11 | −2.698151E−12 |

TABLE 18

|  | DD[6] | DD[16] | DD[18] | DD[20] |
|---|---|---|---|---|
| Wide-angle end | 23.28 | 3.00 | 2.39 | 1.00 |
| Intermediate | 8.68 | 10.37 | 2.39 | 1.00 |
| Telephoto end | 0.88 | 24.63 | 3.02 | 1.04 |

|  | Zoom magnification | f | Bf | FNo. | 2ω[°] |
|---|---|---|---|---|---|
| Wide-angle end | 1.0 | 7.35 | 3.92 | 2.08 | 81.13 |
| Intermediate | 1.9 | 14.26 | 3.92 | 2.92 | 43.04 |
| Telephoto end | 3.8 | 27.70 | 4.59 | 4.55 | 22.56 |

TABLE 19

Example 7: Basic Lens Data

| Si | Ri | Di | Ndj | vdj |
|---|---|---|---|---|
| 1 | 49.9991 | 0.90 | 1.882997 | 40.76 |
| 2 | 10.0000 | 2.80 |  |  |
| 3 | 55.4983 | 0.75 | 1.882997 | 40.76 |
| 4 | 26.9302 | 2.90 |  |  |
| *5 | 36.9032 | 2.30 | 1.999000 | 20.48 |
| *6 | 500.0891 | DD[6] (variable) |  |  |
| 7 (aperture stop) | ∞ | 0.80 |  |  |
| *8 | 10.0000 | 3.14 | 1.693500 | 53.20 |
| *9 | 23.6266 | 0.10 |  |  |
| 10 | 8.8535 | 3.51 | 1.496999 | 81.54 |
| 11 | 272.9422 | 0.80 | 1.755199 | 27.51 |
| 12 | 7.5001 | 1.50 |  |  |
| *13 | 10.0639 | 2.10 | 1.803480 | 40.44 |
| *14 | −25.9535 | 1.33 |  |  |
| 15 | −14.1692 | 2.10 | 1.639799 | 34.46 |
| 16 | 15.3177 | DD[16] (variable) |  |  |
| 17 | 22.9091 | 3.00 | 1.496999 | 81.54 |
| 18 | −27.0135 | DD[18] (variable) |  |  |
| 19 | ∞ | 0.80 | 1.516798 | 64.20 |
| 20 | ∞ | DD[20] (variable) |  |  |

*aspherical surface

TABLE 20

Example 7: Data of Aspherical Surfaces

| Surface No. | KA | A3 | A4 | A5 | A6 |
|---|---|---|---|---|---|
| 5 | 0.000000E+00 | −8.880494E−05 | 4.191742E−04 | −5.980656E−04 | 3.980065E−04 |
| 6 | 0.000000E+00 | 5.395461E−05 | −1.293342E−04 | 7.344024E−06 | 2.400661E−05 |
| 8 | 0.000000E+00 | −2.686663E−05 | 5.862824E−05 | 4.579417E−05 | −1.127586E−05 |
| 9 | 0.000000E+00 | −3.403974E−07 | 3.278091E−05 | 2.348761E−05 | −3.179042E−06 |
| 13 | 0.000000E+00 | −3.416739E−04 | 7.536647E−04 | −2.314772E−04 | 6.073760E−05 |
| 14 | 0.000000E+00 | −5.860723E−04 | 1.477267E−03 | −7.664555E−04 | 3.482394E−04 |

|  | A7 | A8 | A9 | A10 | A11 |
|---|---|---|---|---|---|
| 5 | −1.467092E−04 | 3.086144E−05 | −3.106951E−06 | −4.356688E−08 | 3.178985E−08 |
| 6 | −1.217333E−05 | 2.732435E−06 | −3.087532E−07 | 4.898068E−09 | 3.437502E−09 |
| 8 | −2.292738E−08 | 1.766067E−07 | 2.140926E−08 | −5.933345E−09 | 0.000000E+00 |
| 9 | −1.475978E−06 | 7.937169E−08 | 6.735406E−08 | −1.063391E−08 | 0.000000E+00 |
| 13 | 1.831573E−05 | −8.835552E−06 | 1.821467E−06 | −5.659848E−07 | 6.686133E−08 |
| 14 | −5.735767E−05 | −4.865904E−06 | 5.027895E−06 | −1.311289E−06 | 2.186812E−07 |

|  | A12 | A13 | A14 | A15 | A16 |
|---|---|---|---|---|---|
| 5 | 1.421394E−09 | −4.114879E−10 | −8.619316E−11 | 1.487540E−11 | 9.062263E−13 |
| 6 | −9.632591E−11 | −6.292369E−11 | −2.870859E−12 | 1.716390E−12 | 1.838249E−14 |
| 8 | 0.000000E+00 | 0.000000E+00 | 0.000000E+00 | 0.000000E+00 | 0.000000E+00 |
| 9 | 0.000000E+00 | 0.000000E+00 | 0.000000E+00 | 0.000000E+00 | 0.000000E+00 |
| 13 | −3.246129E−09 | 1.961567E−08 | −3.896251E−09 | 6.684427E−10 | −7.870220E−10 |
| 14 | −4.070156E−08 | 1.090813E−08 | −3.235273E−09 | 1.355714E−09 | 1.384744E−10 |

|  | A17 | A18 | A19 | A20 |
|---|---|---|---|---|
| 5 | −2.841082E−13 | 1.502558E−14 | 6.253805E−17 | −1.420787E−17 |
| 6 | −2.518243E−14 | 1.665355E−15 | −4.792829E−17 | 1.840309E−18 |
| 8 | 0.000000E+00 | 0.000000E+00 | 0.000000E+00 | 0.000000E+00 |
| 9 | 0.000000E+00 | 0.000000E+00 | 0.000000E+00 | 0.000000E+00 |
| 13 | 1.047004E−10 | 5.652912E−11 | −1.551561E−11 | 1.062483E−12 |
| 14 | −1.375026E−10 | −4.485042E−11 | 2.518058E−11 | −2.705333E−12 |

TABLE 21

|  | DD[6] | DD[16] | DD[18] | DD[20] |
|---|---|---|---|---|
| Wide-angle end | 23.57 | 3.86 | 2.76 | 1.01 |
| Intermediate | 8.94 | 11.45 | 2.42 | 1.02 |
| Telephoto end | 0.99 | 25.34 | 2.61 | 1.17 |

|  | Zoom magnification | f | Bf | FNo. | 2ω[°] |
|---|---|---|---|---|---|
| Wide-angle end | 1.0 | 7.35 | 4.30 | 2.08 | 81.13 |
| Intermediate | 1.9 | 14.27 | 3.97 | 2.93 | 42.98 |
| Telephoto end | 3.8 | 27.70 | 4.31 | 4.56 | 22.61 |

TABLE 22

Example 8: Basic Lens Data

| Si | Ri | Di | Ndj | vdj |
|---|---|---|---|---|
| 1 | 49.9992 | 0.90 | 1.882997 | 40.76 |
| 2 | 9.8900 | 3.00 |  |  |
| 3 | 42.0138 | 0.75 | 1.882997 | 40.76 |
| 4 | 23.2388 | 1.50 |  |  |
| *5 | 32.2414 | 2.30 | 1.999000 | 20.48 |
| *6 | 500.0000 | DD[6] (variable) |  |  |
| 7 (aperture stop) | ∞ | 0.80 |  |  |
| *8 | 10.0000 | 2.80 | 1.693500 | 53.20 |
| *9 | 36.9185 | 0.10 |  |  |
| 10 | 10.5441 | 3.51 | 1.496999 | 81.54 |
| 11 | −505.8144 | 0.80 | 1.755199 | 27.51 |
| 12 | 7.5001 | 2.50 |  |  |
| *13 | 10.0000 | 2.10 | 1.803480 | 40.44 |
| *14 | −16.9864 | 1.00 |  |  |
| 15 | −12.4999 | 2.10 | 1.639799 | 34.46 |
| 16 | 12.4999 | DD[16] (variable) |  |  |
| 17 | 21.4038 | 3.00 | 1.496999 | 81.54 |
| 18 | −32.2212 | DD[18] (variable) |  |  |
| 19 | ∞ | 0.80 | 1.516798 | 64.20 |
| 20 | ∞ | DD[20] (variable) |  |  |

*aspherical surface

TABLE 23

Example 8: Data of Aspherical Surfaces

| Surface No. | KA | A3 | A4 | A5 | A6 |
|---|---|---|---|---|---|
| 5 | 0.000000E+00 | −6.382439E−05 | 3.669788E−04 | −5.907396E−04 | 3.943256E−04 |
| 6 | 0.000000E+00 | 5.213277E−05 | −1.562372E−04 | −7.579221E−06 | 2.593462E−05 |
| 8 | 0.000000E+00 | 1.360266E−05 | −7.741682E−05 | 4.785372E−05 | −9.476985E−06 |
| 9 | 0.000000E+00 | 1.004411E−04 | −2.551312E−04 | 6.591357E−05 | −1.544282E−05 |
| 13 | 0.000000E+00 | −2.031584E−04 | 2.364433E−04 | −1.097570E−04 | −2.128695E−05 |
| 14 | 0.000000E+00 | −4.731918E−04 | 9.204000E−04 | −6.784464E−04 | 2.850763E−04 |

|  | A7 | A8 | A9 | A10 | A11 |
|---|---|---|---|---|---|
| 5 | −1.463092E−04 | 3.087464E−05 | −3.109580E−06 | −4.425403E−08 | 3.179330E−08 |
| 6 | −1.221623E−05 | 2.706362E−06 | −3.098286E−07 | 4.990384E−09 | 3.465693E−09 |
| 8 | −1.338885E−06 | 1.393659E−07 | 9.904295E−08 | −1.589882E−08 | 0.000000E+00 |
| 9 | −5.344381E−07 | 2.368320E−07 | 4.706385E−08 | −1.133290E−08 | 0.000000E+00 |
| 13 | 3.253958E−05 | −6.533088E−06 | −6.822754E−07 | 9.823759E−08 | −5.148500E−09 |
| 14 | −5.295393E−05 | −4.375801E−06 | 6.214158E−06 | −2.259302E−06 | 4.460657E−07 |

|  | A12 | A13 | A14 | A15 | A16 |
|---|---|---|---|---|---|
| 5 | 1.425022E−09 | −4.103987E−10 | −8.615759E−11 | 1.488568E−11 | 9.040280E−13 |
| 6 | −9.392980E−11 | −6.234680E−11 | −2.902607E−12 | 1.711180E−12 | 1.709075E−14 |
| 8 | 0.000000E+00 | 0.000000E+00 | 0.000000E+00 | 0.000000E+00 | 0.000000E+00 |
| 9 | 0.000000E+00 | 0.000000E+00 | 0.000000E+00 | 0.000000E+00 | 0.000000E+00 |
| 13 | −2.642447E−09 | 1.895869E−08 | −3.923880E−09 | 7.436064E−10 | −7.853486E−10 |
| 14 | −6.616892E−08 | 1.101792E−08 | −1.819677E−09 | 1.135710E−09 | 3.242510E−11 |

|  | A17 | A18 | A19 | A20 |
|---|---|---|---|---|
| 5 | −2.842447E−13 | 1.498793E−14 | 6.113207E−17 | −1.344500E−17 |
| 6 | −2.529272E−14 | 1.638010E−15 | −4.620852E−17 | 2.349209E−18 |
| 8 | 0.000000E+00 | 0.000000E+00 | 0.000000E+00 | 0.000000E+00 |
| 9 | 0.000000E+00 | 0.000000E+00 | 0.000000E+00 | 0.000000E+00 |
| 13 | 9.433553E−11 | 5.905906E−11 | −1.548256E−11 | 1.012733E−12 |
| 14 | −1.226244E−10 | −4.282060E−11 | 2.569295E−11 | −2.866614E−12 |

TABLE 24

|  | DD[6] | DD[16] | DD[18] | DD[20] |
|---|---|---|---|---|
| Wide-angle end | 23.34 | 2.97 | 3.27 | 1.00 |
| Intermediate | 8.86 | 10.65 | 2.80 | 1.00 |
| Telephoto end | 1.07 | 24.44 | 2.71 | 1.02 |

|  | Zoom magnification | f | Bf | FNo. | 2ω[°] |
|---|---|---|---|---|---|
| Wide-angle end | 1.0 | 7.35 | 4.80 | 2.08 | 81.19 |
| Intermediate | 1.9 | 14.26 | 4.33 | 2.90 | 43.19 |
| Telephoto end | 3.8 | 27.70 | 4.26 | 4.58 | 22.54 |

TABLE 25

Example 9: Basic Lens Data

| Si | Ri | Di | Ndj | vdj |
|---|---|---|---|---|
| 1 | 49.9991 | 0.90 | 1.882997 | 40.76 |
| 2 | 10.0000 | 2.80 | | |
| 3 | 42.1996 | 0.75 | 1.882997 | 40.76 |
| 4 | 23.6234 | 2.90 | | |
| *5 | 33.0809 | 2.30 | 1.999000 | 20.48 |
| *6 | 181.3780 | DD[6] (variable) | | |
| 7 (aperture stop) | ∞ | 0.80 | | |
| *8 | 10.0000 | 2.80 | 1.693500 | 53.20 |
| *9 | 28.5226 | 0.10 | | |
| 10 | 8.8000 | 3.51 | 1.496999 | 81.54 |
| 11 | 138.4159 | 0.80 | 1.755199 | 27.51 |
| 12 | 7.5173 | 2.50 | | |
| *13 | 10.6332 | 2.10 | 1.803480 | 40.44 |
| *14 | −20.8262 | 1.00 | | |
| 15 | −12.5000 | 2.10 | 1.639799 | 34.46 |
| 16 | 13.3451 | DD[16] (variable) | | |
| 17 | 19.9462 | 2.80 | 1.496999 | 81.54 |
| 18 | −29.6215 | DD[18] (variable) | | |
| 19 | ∞ | 0.80 | 1.516798 | 64.20 |
| 20 | ∞ | DD[20] (variable) | | |

*aspherical surface

TABLE 26

Example 9: Data of Aspherical Surfaces

| Surface No. | KA | A3 | A4 | A5 | A6 |
|---|---|---|---|---|---|
| 5 | 0.000000E+00 | −1.138684E−04 | 4.439928E−04 | −5.922108E−04 | 3.935357E−04 |
| 6 | 0.000000E+00 | 2.421047E−05 | −8.624329E−05 | −6.545906E−06 | 2.753712E−05 |
| 8 | 0.000000E+00 | 2.090749E−05 | 3.126975E−05 | 6.389773E−05 | −1.295898E−05 |
| 9 | 0.000000E+00 | 7.594641E−05 | −3.135074E−05 | 5.327775E−05 | −5.804090E−06 |
| 13 | 0.000000E+00 | −1.927971E−04 | 3.269027E−04 | −1.270587E−04 | −9.162797E−06 |
| 14 | 0.000000E+00 | −4.589418E−04 | 1.087397E−03 | −8.422803E−04 | 4.221715E−04 |

| | A7 | A8 | A9 | A10 | A11 |
|---|---|---|---|---|---|
| 5 | −1.457318E−04 | 3.082931E−05 | −3.115498E−06 | −4.377672E−08 | 3.187488E−08 |
| 6 | −1.253177E−05 | 2.698098E−06 | −2.990376E−07 | 5.457423E−09 | 3.375655E−09 |
| 8 | −3.048661E−07 | 2.041907E−07 | 4.167173E−08 | −7.653892E−09 | 0.000000E+00 |
| 9 | −2.240168E−06 | 1.970489E−07 | 1.141098E−07 | −1.622777E−08 | 0.000000E+00 |
| 13 | 3.427919E−05 | −1.081819E−05 | 1.551263E−06 | −5.714259E−07 | 1.061011E−07 |
| 14 | −9.038334E−05 | −8.322479E−06 | 9.204119E−06 | −2.041751E−06 | 2.694997E−07 |

| | A12 | A13 | A14 | A15 | A16 |
|---|---|---|---|---|---|
| 5 | 1.433462E−09 | −4.101124E−10 | −8.639091E−11 | 1.484995E−11 | 9.016426E−13 |
| 6 | −1.245242E−10 | −6.087427E−11 | −3.183973E−12 | 1.823326E−12 | 1.138021E−14 |
| 8 | 0.000000E+00 | 0.000000E+00 | 0.000000E+00 | 0.000000E+00 | 0.000000E+00 |
| 9 | 0.000000E+00 | 0.000000E+00 | 0.000000E+00 | 0.000000E+00 | 0.000000E+00 |
| 13 | −1.167058E−08 | 1.866141E−08 | −3.841565E−09 | 8.844524E−10 | −8.494566E−10 |
| 14 | −6.194349E−08 | 6.660375E−09 | −1.676628E−09 | 1.904654E−09 | 1.987762E−11 |

| | A17 | A18 | A19 | A20 |
|---|---|---|---|---|
| 5 | −2.836251E−13 | 1.501401E−14 | 7.955121E−17 | −1.563336E−17 |
| 6 | −2.456903E−14 | 1.506931E−15 | −4.298744E−17 | 2.473954E−18 |
| 8 | 0.000000E+00 | 0.000000E+00 | 0.000000E+00 | 0.000000E+00 |
| 9 | 0.000000E+00 | 0.000000E+00 | 0.000000E+00 | 0.000000E+00 |
| 13 | 1.068122E−10 | 5.672977E−11 | −1.499225E−11 | 9.608711E−13 |
| 14 | −1.374183E−10 | −4.792050E−11 | 2.586627E−11 | −2.728737E−12 |

TABLE 27

|  | DD[6] | DD[16] | DD[18] | DD[20] |
|---|---|---|---|---|
| Wide-angle end | 23.50 | 4.03 | 2.54 | 1.00 |
| Intermediate | 8.81 | 11.50 | 2.40 | 1.00 |
| Telephoto end | 0.97 | 25.64 | 2.78 | 1.00 |

|  | Zoom magnification | f | Bf | FNo. | 2ω[°] |
|---|---|---|---|---|---|
| Wide-angle end | 1.0 | 7.35 | 4.07 | 2.08 | 81.18 |
| Intermediate | 1.9 | 14.27 | 3.93 | 2.91 | 43.01 |
| Telephoto end | 3.8 | 27.70 | 4.31 | 4.56 | 22.57 |

TABLE 28

Example 10: Basic Lens Data

| Si | Ri | Di | Ndj | vdj |
|---|---|---|---|---|
| 1 | 49.9991 | 0.90 | 1.882997 | 40.76 |
| 2 | 10.0000 | 2.80 | | |
| 3 | 43.2866 | 0.75 | 1.882997 | 40.76 |
| 4 | 19.9821 | 3.23 | | |
| *5 | 35.0020 | 2.30 | 1.999000 | 20.48 |
| *6 | 500.0995 | DD[6] (variable) | | |
| 7 (aperture stop) | ∞ | 0.80 | | |
| *8 | 10.0000 | 3.50 | 1.693500 | 53.20 |
| *9 | 45.4212 | 0.10 | | |
| 10 | 8.8000 | 3.51 | 1.496999 | 81.54 |
| 11 | −1337.9817 | 0.80 | 1.761821 | 26.52 |
| 12 | 7.5001 | 2.50 | | |
| *13 | 10.0000 | 2.10 | 1.803480 | 40.44 |
| *14 | 18.2952 | 1.00 | | |
| 15 | 51.6026 | 2.10 | 1.666800 | 33.05 |
| 16 | 19.9999 | DD[16] (variable) | | |
| 17 | 29.5958 | 3.00 | 1.496999 | 81.54 |
| 18 | −29.8224 | DD[18] (variable) | | |
| 19 | ∞ | 0.80 | 1.516798 | 64.20 |
| 20 | ∞ | DD[20] (variable) | | |

*aspherical surface

TABLE 29

Example 10: Data of Aspherical Surfaces

| Surface No. | KA | A3 | A4 | A5 | A6 |
|---|---|---|---|---|---|
| 5 | 0.000000E+00 | 7.093679E−07 | 3.720843E−04 | −5.851393E−04 | 3.971706E−04 |
| 6 | 0.000000E+00 | 1.513155E−04 | −1.830000E−04 | 1.842060E−05 | 2.519341E−05 |
| 8 | 0.000000E+00 | 6.023312E−05 | −5.514158E−05 | 5.999661E−05 | −1.034601E−05 |
| 9 | 0.000000E+00 | 1.079567E−05 | −1.270640E−04 | 2.090072E−05 | −2.252420E−06 |
| 13 | 0.000000E+00 | −7.090630E−04 | 1.916188E−04 | −3.512721E−04 | 2.984603E−05 |
| 14 | 0.000000E+00 | −9.329304E−04 | 9.934464E−04 | −8.829851E−04 | 3.069489E−04 |

|  | A7 | A8 | A9 | A10 | A11 |
|---|---|---|---|---|---|
| 5 | −1.466694E−04 | 3.085834E−05 | −3.108903E−06 | −4.357601E−08 | 3.183793E−08 |
| 6 | −1.250851E−05 | 2.704787E−06 | −3.042242E−07 | 5.593523E−09 | 3.487080E−09 |
| 8 | −2.960460E−07 | 1.259118E−07 | 2.885701E−08 | −4.997710E−09 | 0.000000E+00 |
| 9 | −8.232802E−07 | 4.094091E−08 | 4.163720E−08 | −5.793096E−09 | 0.000000E+00 |
| 13 | 1.863679E−05 | −6.956251E−06 | 1.273339E−06 | −6.719283E−07 | 5.234325E−08 |
| 14 | −5.427410E−05 | −1.474506E−06 | 3.732139E−06 | −1.727907E−06 | 2.754966E−07 |

|  | A12 | A13 | A14 | A15 | A16 |
|---|---|---|---|---|---|
| 5 | 1.428484E−09 | −4.111692E−10 | −8.625131E−11 | 1.486001E−11 | 9.038735E−13 |
| 6 | −1.032312E−10 | −6.376949E−11 | −3.024691E−12 | 1.720231E−12 | 1.776593E−14 |
| 8 | 0.000000E+00 | 0.000000E+00 | 0.000000E+00 | 0.000000E+00 | 0.000000E+00 |
| 9 | 0.000000E+00 | 0.000000E+00 | 0.000000E+00 | 0.000000E+00 | 0.000000E+00 |
| 13 | −1.748709E−09 | 2.064290E−08 | −3.008178E−09 | 4.990905E−10 | −8.009826E−10 |
| 14 | −1.126520E−08 | 1.240611E−08 | −2.013811E−09 | 3.361846E−10 | 8.439294E−12 |

|  | A17 | A18 | A19 | A20 |
|---|---|---|---|---|
| 5 | −2.841141E−13 | 1.506801E−14 | 7.007030E−17 | −1.507409E−17 |
| 6 | −2.471532E−14 | 1.695398E−15 | −4.795425E−17 | 1.222728E−18 |
| 8 | 0.000000E+00 | 0.000000E+00 | 0.000000E+00 | 0.000000E+00 |
| 9 | 0.000000E+00 | 0.000000E+00 | 0.000000E+00 | 0.000000E+00 |
| 13 | 1.079237E−10 | 5.586006E−11 | −1.576362E−11 | 1.129441E−12 |
| 14 | −1.077867E−10 | −3.460565E−11 | 2.653862E−11 | −3.315731E−12 |

TABLE 30

|  | DD[6] | DD[16] | DD[18] | DD[20] |
|---|---|---|---|---|
| Wide-angle end | 22.65 | 3.36 | 2.83 | 1.00 |
| Intermediate | 8.64 | 11.26 | 2.42 | 1.00 |
| Telephoto end | 1.16 | 25.71 | 2.47 | 1.00 |

|  | Zoom magnification | f | Bf | FNo. | 2ω[°] |
|---|---|---|---|---|---|
| Wide-angle end | 1.0 | 7.35 | 4.36 | 2.08 | 81.40 |
| Intermediate | 1.9 | 14.26 | 3.95 | 2.94 | 43.14 |
| Telephoto end | 3.8 | 27.69 | 4.00 | 4.57 | 22.58 |

TABLE 31

| Expression No | Conditional Expression | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (1) | fw/25 | −0.495 | −0.587 | −0.691 | −0.573 | −0.629 | −0.688 | −0.656 | −0.777 | −0.751 | −0.146 |
| (2) | (R15 + R16)/(R15 − R16) | 0.000 | 0.218 | 0.076 | −0.341 | −0.119 | −0.124 | −0.039 | 0.000 | −0.033 | 2.266 |
| (3) | D14/fw | 0.092 | 0.136 | 0.136 | 0.136 | 0.242 | 0.215 | 0.182 | 0.136 | 0.136 | 0.136 |
| (4) | D12/fw | 0.340 | 0.340 | 0.340 | 0.340 | 0.340 | 0.519 | 0.204 | 0.340 | 0.340 | 0.340 |
| (5) | ω | 40.73 | 40.63 | 40.58 | 40.65 | 40.56 | 40.56 | 40.57 | 40.60 | 40.59 | 40.70 |

What is claimed is:

1. A zoom lens consisting of three lens groups including, in order from an object side, a first lens group having a negative refractive power, a second lens group having a positive refractive power and a third lens group having a positive refractive power, wherein, during magnification change from a wide-angle end to a telephoto end, at least the first lens group and the second lens group are moved along an optical axis such that an interval between the first lens group and the second lens group is decreased and an interval between the second lens group and the third lens group is increased, the second lens group consists of, in order from the object side, a second-group first lens having a positive refractive power, a cemented lens consisting of a second-group second lens having a positive refractive power and a second-group third lens having a negative refractive power, a second-group fourth lens having a positive refractive power, and a second-group fifth lens having a negative refractive power, and the conditional expressions (1) and (2) below are satisfied:

$$-0.78 < fw/f25 < -0.14 \quad (1), \text{ and}$$

$$-0.35 < (R15+R16)/(R15-R16) < 0.30 \quad (2),$$

where fw is a focal length of the entire lens system at the wide-angle end, f25 is a focal length of the second-group fifth lens, R15 is a paraxial radius of curvature of an object-side surface of the second-group fifth lens, and R16 is a paraxial radius of curvature of an image-side surface of the second-group fifth lens.

2. The zoom lens as claimed in claim 1, wherein the conditional expression (3) below is satisfied:

$$0.02 < D14/fw < 0.3 \quad (3),$$

where D14 is an interval between the second-group fourth lens and the second-group fifth lens along the optical axis.

3. The zoom lens as claimed in claim 2, wherein the conditional expression (3-1) below is satisfied:

$$0.09 < D14/fw < 0.25 \quad (3-1).$$

4. The zoom lens as claimed in claim 1, wherein the conditional expression (4) below is satisfied:

$$0.15 < D12/fw < 0.6 \quad (4),$$

where D12 is an interval between the second-group third lens and the second-group fourth lens along the optical axis.

5. The zoom lens as claimed in claim 1, wherein each of the second-group first lens and the second-group fourth lens has an aspherical surface on at least one side thereof.

6. The zoom lens as claimed in claim 1, wherein the conditional expression (5) below is satisfied:

$$\omega > 38 \quad (5),$$

where ω is a half angle of view at the wide-angle end.

7. An imaging apparatus comprising the zoom lens as claimed in claim 1.

8. A zoom lens consisting of three lens groups including, in order from an object side, a first lens group having a negative refractive power, a second lens group having a positive refractive power and a third lens group having a positive refractive power, wherein, during magnification change from a wide-angle end to a telephoto end, at least the first lens group and the second lens group are moved along an optical axis such that an interval between the first lens group and the second lens group is decreased and an interval between the second lens group and the third lens group is increased, the second lens group consists of, in order from the object side, a second-group first lens having a positive refractive power, a cemented lens consisting of a second-group second lens having a positive refractive power and a second-group third lens having a negative refractive power, a second-group fourth lens having a positive refractive power, and a second-group fifth lens having a negative refractive power, and the conditional expressions (1) and (2) below are satisfied:

$$-0.9 < fw/f25 < 0 \quad (1), \text{ and}$$

$$-0.40 < (R15+R16)/(R15-R16) < 2.40 \quad (2),$$

where fw is a focal length of the entire lens system at the wide-angle end, f25 is a focal length of the second-group fifth lens, R15 is a paraxial radius of curvature of an object-side surface of the second-group fifth lens, and R16 is a paraxial radius of curvature of an image-side surface of the second-group fifth lens, and where the conditional expression (4-1) below is satisfied:

$$0.20 < D12/fw < 0.52 \qquad (4\text{-}1),$$

where D12 is an interval between the second-group third lens and the second-group fourth lens along the optical axis.

* * * * *